US010341742B1

(12) United States Patent
Kim et al.

(10) Patent No.: US 10,341,742 B1
(45) Date of Patent: Jul. 2, 2019

(54) SYSTEMS AND METHODS FOR ALERTING A USER TO MISSED CONTENT IN PREVIOUSLY ACCESSED MEDIA

(71) Applicant: Rovi Guides, Inc., San Jose, CA (US)

(72) Inventors: Clayton Kim, Boston, MA (US); Lucas Waye, Cambridge, MA (US); Richard Eric Miller, Milton, MA (US); Matthew John Emerson, Burlington, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/939,043

(22) Filed: Mar. 28, 2018

(51) Int. Cl.
*G06F 3/00* (2006.01)
*G06F 13/00* (2006.01)
*H04N 5/445* (2011.01)
*H04N 7/16* (2011.01)
*H04H 60/33* (2008.01)
*H04N 21/488* (2011.01)
*H04N 21/442* (2011.01)
*G06K 9/00* (2006.01)
*H04N 21/472* (2011.01)

(52) U.S. Cl.
CPC ..... *H04N 21/4882* (2013.01); *G06K 9/00765* (2013.01); *H04N 21/44204* (2013.01); *H04N 21/47214* (2013.01)

(58) Field of Classification Search
None
See application file for complete search history.

(56) References Cited

U.S. PATENT DOCUMENTS

| 6,239,794 | B1 | 5/2001 | Yuen et al. |
| 6,564,378 | B1 | 5/2003 | Satterfield et al. |
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 8,843,951 | B1* | 9/2014 | Sherrets ............... H04N 21/472 709/224 |
| 9,015,736 | B2* | 4/2015 | Cordray ................ G06F 3/0482 725/10 |
| 9,852,774 | B2* | 12/2017 | Golyshko ............. G11B 27/28 |
| 10,063,927 | B1* | 8/2018 | Singh ............... H04N 21/47205 |
| 10,149,008 | B1* | 12/2018 | Logan .............. H04N 21/44218 |
| 2002/0174430 | A1 | 11/2002 | Ellis et al. |
| 2003/0093461 | A1* | 5/2003 | Suzuki .................... H04L 29/06 709/202 |
| 2005/0238315 | A1* | 10/2005 | Kataoka ............... G11B 27/034 386/296 |
| 2005/0251827 | A1 | 11/2005 | Ellis et al. |
| 2007/0101369 | A1* | 5/2007 | Dolph ................ H04N 7/17318 725/46 |

(Continued)

*Primary Examiner* — William J Kim
(74) *Attorney, Agent, or Firm* — Haley Guiliano LLP

(57) ABSTRACT

Methods and systems are described herein for notifying a user about content that the user has previously missed in media. Users may get easily distracted when viewing media by mobile device notifications or other users viewing the media with the user. Consequentially, the user may miss content in media. The user may miss the same content in the media when consuming the media for a second time if the distractions are still present. An interactive media guide determines when the user has previously missed content in media and alerts the user when the content is going to be missed for a second time.

20 Claims, 8 Drawing Sheets

(56) References Cited

U.S. PATENT DOCUMENTS

| | | | |
|---|---|---|---|
| 2007/0157249 A1* | 7/2007 | Cordray | G06F 3/0482 725/58 |
| 2009/0007195 A1* | 1/2009 | Beyabani | H04N 7/163 725/86 |
| 2009/0074012 A1* | 3/2009 | Shaffer | H04J 3/0632 370/516 |
| 2009/0077598 A1* | 3/2009 | Watson | H04N 7/17318 725/93 |
| 2009/0183210 A1* | 7/2009 | Andrade | H04N 7/163 725/87 |
| 2009/0328115 A1* | 12/2009 | Malik | H04N 7/17318 725/93 |
| 2010/0050202 A1* | 2/2010 | Kandekar | G06Q 30/02 725/14 |
| 2010/0086277 A1* | 4/2010 | Craver | H04N 5/76 386/278 |
| 2010/0153885 A1 | 6/2010 | Yates | |
| 2010/0241963 A1* | 9/2010 | Kulis | G06F 3/167 715/727 |
| 2012/0096497 A1* | 4/2012 | Xiong | H04N 21/2187 725/50 |
| 2014/0037264 A1* | 2/2014 | Jackson | H04N 5/44513 386/230 |
| 2014/0078039 A1* | 3/2014 | Woods | H04N 21/4223 345/156 |
| 2014/0255004 A1* | 9/2014 | Allen | H04H 60/377 386/241 |
| 2015/0245105 A1* | 8/2015 | Wickenkamp | G06F 16/70 725/44 |
| 2015/0319400 A1* | 11/2015 | Golyshko | G11B 27/28 386/230 |
| 2016/0011743 A1* | 1/2016 | Fundament | G06F 3/0482 715/716 |
| 2016/0142761 A1* | 5/2016 | Govinde | H04N 21/4334 386/296 |
| 2017/0332125 A1* | 11/2017 | Panchaksharaiah | H04N 21/21805 |
| 2018/0367484 A1* | 12/2018 | Rodriguez | H04L 51/063 |

* cited by examiner

300

Data exchange format

```
{
    "userNum" : 1035485,
    "assetType" : "Movie",
    "title" : "The Godfather",
    "mediaID" : 38339399,
    "lastWatched": 2/7/2018,
    ...
    "missedSegments" : [
        {"start": "20", "end": "39", "description": "Character Death", "missedOn" : "2/7/2018"},
        {"start": "150", "end": "175", "description": "Famous Scene", "missedOn" : "2/7/2018"}
    ]
    ...
}
```

SYSTEMS AND METHODS FOR ALERTING A USER TO MISSED CONTENT IN PREVIOUSLY ACCESSED MEDIA

BACKGROUND

The proliferation of new technologies has allowed users to do more tasks at the same time. For example, a user may consume media while performing another task, such as responding to an email on a smartphone or talking to a friend. However, the user will miss content in the media asset when their attention is directed to another task. Oftentimes, a user will not remember at what point in the media they were distracted from consuming the media. Consequently, the user will consume the media for a second time to catch up on the content that was missed the first time. If the user is distracted once again while consuming the media for the second time, the user will miss the content again and will need to consume the media for a third time to catch up on the missed content.

SUMMARY

Accordingly systems and methods are described herein for a media guidance application that automatically alerts a user to maintain attention to segments of media assets. Specifically, the media guidance application may determine that a user missed a segment of a media asset during a first viewing of the media asset and may alert the user when the segment is played back during a second viewing of the media asset. For example, a user may be distracted by a telephone call while watching the movie "The Godfather" during a second scene of the movie. If the system detects that the user is distracted when watching the second scene of "The Godfather" for a second time, the system may alert the user, during the second scene, so that the user directs their attention to the scene and does not miss it again. Accordingly, the system ensures that the user does not miss a segment of the media asset multiple times by providing the alert.

For example, the media guidance application may track a history of media assets consumed by a user. For example, the media guidance application may generate for display a program guide and may track when a user selects media, such as "The Godfather," for display by the media guidance application. The media guidance application may track user behavior while consuming the media asset to determine whether the user is directing their attention to the media asset. For example, the media guidance application may generate for display the selected media asset ("The Godfather") on a display of the media guidance application and may use a camera of the media guidance application to track whether the user is directing their attention to the display. When the media guidance application determines that the user is distracted, the media guidance application may create a log indicating when the user was distracted. For example, the media guidance application may detect that the user is distracted during a second scene of "The Godfather" and may create a log entry indicating that the user was distracted during the second scene.

The media guidance application may detect that the user is consuming the media asset for a second time. For example, the media guidance application may determine that the user is watching "The Godfather" a month after first watching "The Godfather." The media guidance application may retrieve the log to determine whether portions of "The Godfather" were previously missed by the user. For example, the media guidance application may request a log from the user profile associated with "The Godfather" and may analyze the log for entries indicating scenes missed by the user. The media guidance application may track the playback of the media and may trigger an alert if the user is distracted for a second time during the scene. For example, the media guidance application may compare an entry in the log that indicates that the user missed the second scene with a playback time of "The Godfather". When the media guidance application determines that the playback time matches the time indicated in the log entry, the media guidance application may determine whether the user is again distracted. For example, the media guidance application may use the camera to determine whether the user is paying attention to a screen of the media guidance application displaying "The Godfather". If the media guidance application determines that the user is distracted during the scene, the media guidance application may output an alert to the user. For example, the media guidance application may determine that the user is distracted when the user is paying attention to their phone while the scene is generated for display by the media guidance application. In response to determining that the user is distracted, the media guidance application may generate an audio alert, such as a beep, to alert the user to maintain attention to the scene.

In some aspects, the media guidance application may generate for display to a user, during a first time period, a media asset. For example, the media guidance application may generate for display a program guide including a plurality of media, such as a collection of movies, on a display accessible to the media guidance application, such as a television. The media guidance application may receive a user selection of a media asset from the program guide, such as the movie "The Godfather," and may generate for display the movie "The Godfather" on the display (e.g., television). In response to receiving the user selection, the media guidance application may, for example, tune to a channel associated with the movie "The Godfather".

The media guidance application may detect that the user is disregarding a segment of the media asset during the first time period. For example, the media guidance application may generate for display the media asset (e.g., "The Godfather") on a display associated with a first user device (e.g., a television of the user). The media guidance application, after generating for display the media asset (e.g., "The Godfather"), may track the user to determine whether the user is maintaining attention to "The Godfather". The media guidance application may determine that the user is disregarding the media asset when the media guidance application determines that the user is directing their attention to a second user device, such as a smartphone, while the media asset is being played back on the first user device. For example, the media guidance application may monitor an activity level on the second device and may determine that when activity is detected on the second device, such as texting activity, that the user is disregarding the media (e.g., because the user is paying attention to the texting as opposed to the media asset).

In some embodiments, the media guidance application may utilize a camera to track the user during playback of the media asset. For example, the media guidance application may track a gaze point of the user while the media guidance application generates for display the media asset. For example, the media guidance application may track the eyes of the user using a display-mounted camera accessible to the media guidance application. The media guidance application may determine that the user is maintaining attention to "The Godfather" when the user's eyes are detectable by the camera. The media guidance application may determine that the user is disregarding a segment of the media guidance application by, for example, determining that the user's eyes are not visible to the camera while a segment of the media asset is generated for display by the media guidance application, and therefore the user is not paying attention to the display of the media asset.

In response to detecting that the user is disregarding the segment of the media asset during the first time period, the media guidance application may store, in a profile associated with the user, a position within the media asset corresponding to the segment of the media asset disregarded by the user and an indication that the user disregarded the segment of the media asset during the first time period. For example, the media guidance application may determine an identity for the user (e.g., using login credentials provided to the media guidance application) and may retrieve a profile from memory associated with the identified user. The media guidance application may store, in the profile, data indicating the media asset selected by the user (e.g., "The Godfather") and data indicating the portions of the media asset where the media guidance application determined that the user was distracted. For example, the media guidance application may determine that the user is distracted during the fifth and sixth minute of the "The Godfather". The media guidance application may store data in the profile indicating that the user watched "The Godfather" but was distracted from the fifth to the sixth minute.

For example, the media guidance application may determine that the user watched the movies "The Godfather" and "The Shawshank Redemption", and the songs "In Da Club" and "Stairway to Heaven" by retrieving, from the profile, a history of media requested by the user. For example, the media guidance application may determine that the user was not distracted while listening to the songs "Stairway to Heaven" or "In Da Club" (e.g., by analyzing ambient noise in a listening environment associated with playback of the two songs) nor during playback of "The Shawshank Redemption". Accordingly, the media guidance application may store data indicating that the user accessed the media, but may not store data indicating that the user missed any portion of that media (e.g., because the media guidance application did not detect any missed portions). However, if the media guidance application determines that the user missed a segment of the movie "The Godfather," the media guidance application may store data in the profile indicating that the user consumed the movie "The Godfather" and may also store data indicating that the user missed the segment of the media asset (e.g., by storing the position of the segment in the media asset).

The media guidance application may generate for display to the user, during a second time period subsequent to the first time period, the media asset, beginning at a time in the media asset preceding the segment. For example, the media guidance application may generate for display the program guide as described above. The media guidance application may detect a user selection of the media asset at a second time (e.g., a week after the user first selected the media asset). In response to receiving the second user selection of the media asset, the media guidance application may generate for display the media asset. For example, the media guidance application may receive a second user selection of "The Godfather" from a program guide associated with the media guidance application. For example, the media guidance application may generate for display the media asset at a beginning of the media asset (e.g., at a first scene of the media asset). In response to receiving the user selection of "The Godfather" from the displayed program guide, the media guidance application may generate for display the media asset by, for example, requesting a copy of the media asset from a server of a content provider associated with the media asset.

The media guidance application may determine, based on the profile of the user, whether the user has previously accessed the media asset. For example, as described above, the media guidance application may update a profile of the user to indicate media assets that were previously consumed by the user and may indicate portions of those consumed media assets that were missed by the user. For example, the media guidance application may retrieve a viewing history for the user indicating that the user viewed the movies "The Godfather" and "The Shawshank Redemption". The media guidance application may compare the selected media asset, "The Godfather" to the viewing history to determine that the user previously viewed "The Godfather".

In response to determining that the user previously accessed the media asset, the media guidance application may retrieve, from the profile, the indication that the user disregarded the segment of the media asset and the position within the media asset corresponding to the segment of the media asset. For example, the media guidance application may retrieve, from the profile, the data indicating that the user viewed the movie "The Godfather" and missed a segment of the movie the "The Godfather". The media guidance application may determine, based on the profile, the position of the segment within the media asset. For example, the profile may comprise an indication of the time where the user disregarded the media (e.g., between the fifth minute and the sixth minute).

The media guidance application may determine, during the second time period, whether a play position in the media asset corresponds to the position of the segment. For example, the media guidance application may track a play position of the media asset based on a number of seconds that elapsed since a beginning playback position of the media asset. For example, the media guidance application may determine that the play position is 60 when the media guidance application generates for display a frame, of a sequence of frames of the media asset, corresponding to the 60-second mark. The media guidance application may compare the play time with the position of the segment to determine whether the content currently generated for display by the media guidance application was missed by the user. For example, the media guidance application may retrieve, from the profile, time intervals indicating segments of the media asset that were missed by the user. The media guidance application may compare a start time of the interval with the play time to determine whether the segment is being played back by the media guidance application. If the media guidance application determines that the media guidance application is not playing back the segment (e.g., the play time does not match the start time of the interval), the media guidance application continues playback of the media asset. If the media guidance application determines that the play time matches the start time of the interval (e.g., the media guidance application is playing back the segment) the media guidance application may output an alert if the media guidance application determines that user is again disregarding the segment.

In response to determining that the play position of the media asset corresponds to the position of the segment, the media guidance application determines whether the user is disregarding the media asset during the second time period (e.g., the time period when the user is viewing the media asset for the second time). The media guidance application may determine that the user is disregarding the media asset by, for example, analyzing a noise level of a room corresponding to the display (e.g., the television displaying the media asset). The media guidance application may determine that the user is disregarding the media asset when the noise level is above a threshold maximum noise level (e.g., because when the noise is above the threshold maximum noise level the user may not hear the media asset). Additionally, the media guidance application may use any of the methods described above with respect to determining whether the user is disregarding the segment of the media asset during the first period to determine whether the user is disregarding the media asset during the second period.

In response to determining that the user is disregarding the media asset during the second time period, the media guidance application may output the alert to the user, based on the indication that the segment was previously missed by the user so that the user can direct their attention to the segment of the media asset. For example, the media guidance application may determine that the user is disregarding the media asset when the user is playing a game on a second user device, such as a smartphone. The media guidance application may generate an audible alert, such as a beep or a spoken message to attract the user's attention to the display (e.g., a monitor displaying the segment of the media asset that was previously missed by the user).

In some embodiments, the media guidance application may interrupt an activity on a second user device that the media guidance application determines is distracting the user from the media asset. For example, the media guidance application may determine that the user is distracted by a game on a smartphone of the user. In response to determining that the user is distracted from viewing the media asset based on the game, the media guidance application may transmit a request to the second user device to interrupt the game to output the alert on the second device.

In some embodiments, the media guidance application may retrieve, from the profile of the user, attributes of content that are important to the user. For example, the media guidance application may retrieve from the user profile preferences of the user that indicate that the user does not like gory content but likes sports content. The media guidance application may determine attributes of content associated with the segment of the media asset. For example, the media guidance application may perform analysis on closed captioning data associated with a frame of the segment to determine attributes associated with the frame. For example, the media guidance application may determine that when the media guidance application detects that the closed captions contain the text "Gunshots", that content in the frame is gory, and when the closed captions contain the text "Baseball Score" that content in the frame is related to a baseball game.

In some embodiments, the media guidance application may determine whether an attribute of the content associated with the segment matches an attribute of content that is important to the user. For example, the media guidance application may determine the attributes of a frame of the segment, as discussed above, to determine attributes associated with the segment. The media guidance application may compare the attributes of the frame (e.g., baseball game-related content) with attributes that are important to the user (e.g., sports content) and may output the alert to the user when the content associated with the segment matches the attributes of the content that are important to the user. For example, the media guidance application may output an alert to the user when the content that was missed by the user comprises baseball content, because sports content is important to the user and therefore the media guidance application may determine that the user would likely not want to miss the segment.

In some embodiments, the media guidance application suppresses the alert to the user in response to determining that the attributes of the content associated with the segment do not match the attributes of the content that are important to the user. For example, the media guidance application may provide the alert to the user to prevent the user from missing a segment of content that was previously missed by the user. When the media guidance application determines that the segment comprises content that is not important to the user (e.g., content that the user does not prefer watching), the media guidance application may suppress the alert because the user may find the alert annoying or intrusive when alerting about content not important to the user.

In another embodiment, the media guidance application may determine that the segment comprises content that is not important to the user and may allow for the user to skip the content because the user may have intentionally disregarded the content during the first time period. For example, the media guidance application may determine that the segment comprises gory content. The media guidance application may compare the attribute (e.g., gory content) to the attributes that are important to the user (e.g., sports content) and may not output the alert when the segment is directed to content that is not important to the user (e.g., because the user may not be interested in viewing content that they do not find important, or because the segment may contain content that the user dislikes).

In some embodiments, the media guidance application may output an option for the user to skip the segment of the media asset in response to determining that attributes of the segment of the media asset do not match attributes of content that are important to the user. For example, the media guidance application may determine that the segment contains gory content and may determine that the user does not find gory content important (e.g., because the user has an express dislike for gory content). In response to determining that the segment comprises content that is disliked by the user, the media guidance application may output an option for the user to skip the segment. For example, the media guidance application may output an audible alert that the segment has gory content and may prompt the user as to whether the media guidance application should skip the segment or generate for display the segment. In response to receiving a user input selecting the option to skip the segment, the media guidance application may skip the segment. For example, subsequent to receiving the user selection, the media guidance application may identify an end time for the segment, based on the user profile, and may generate for display a frame of the media asset corresponding to the end time for the segment.

In some embodiments, the media guidance application may output the alert on a second user device in response to determining that the user is directing their attention to the second user device while the segment of the media asset is simultaneously generated for display on the first device. For example, the media guidance application may generate for display the media asset on a television accessible to the media asset. The media guidance application may determine that the user is directing their attention to the second device based on determining that the second device is greater than a threshold distance away from the first device. In response to determining that the second device is greater than the threshold distance away from the first device, the media guidance application may output the alert on the second device (e.g., so that the user can perceive the alert).

In some embodiments, the media guidance application may generate for display a selectable option for outputting the segment of the media asset on the second device. For example, the media guidance application may generate an alert on a smartphone of the user including a notification of the missed segment and an option to display the media asset on the second device instead or concurrently with the first device. For example, the media guidance application may generate for display on the second device the segment in response to receiving a user selection of the option.

In some embodiments, in response to determining that the user is disregarding the alert, the media guidance application may concurrently record the segment of the media asset to memory and generate for display the segment. For example, the media guidance application may receive the media asset from a tuner accessible to the media guidance application. The media guidance application may store video data received via the tuner to a memory accessible to the media guidance application and may concurrently generate for display the media asset on a display accessible to the media guidance application.

In some embodiments, the media guidance application may determine that the user is directing attention to the alert subsequent to the generating for display the media asset. For example, the media guidance application may determine that the user disregarded the segment of the media asset and may determine that the user directed attention to the media asset after the segment was generated for display by the media guidance application (e.g., after the user already missed the segment for a second time).

In response to determining that the user is directing attention to the alert subsequent to the generating for display the segment, the media guidance application may retrieve the media asset from memory and may generate for display the retrieved media asset. Concurrently, the media guidance application may buffer frames of the media asset that are subsequent to the segment so that the user may consume the media asset in a time-shifted continuous manner after generating for display the segment. For example, the media guidance application may determine that the user has directed their attention to the media asset after the media guidance application generated for display the segment.

In response to determining that the user directed their attention to the media asset after the segment was generated for display by the media guidance application, the media guidance application may play back the segment of the media asset from a version stored in the memory. Concurrently, while generating for display the segment, the media guidance application may cache portions of the media asset following the segment so that the user can view the media asset in a continuous manner immediately following viewing the segment. For example, the media guidance application may retrieve a segment of "The Godfather" that was missed by the user during the first time period and the second time period from the memory and may generate for display the segment when the media guidance application determines that the user is paying attention to the media asset.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 shows an illustrative example of a metadata exchange format listing segments of media that were previously missed by the user in accordance with some embodiments of the disclosure;

DETAILED DESCRIPTION

Figure 1:
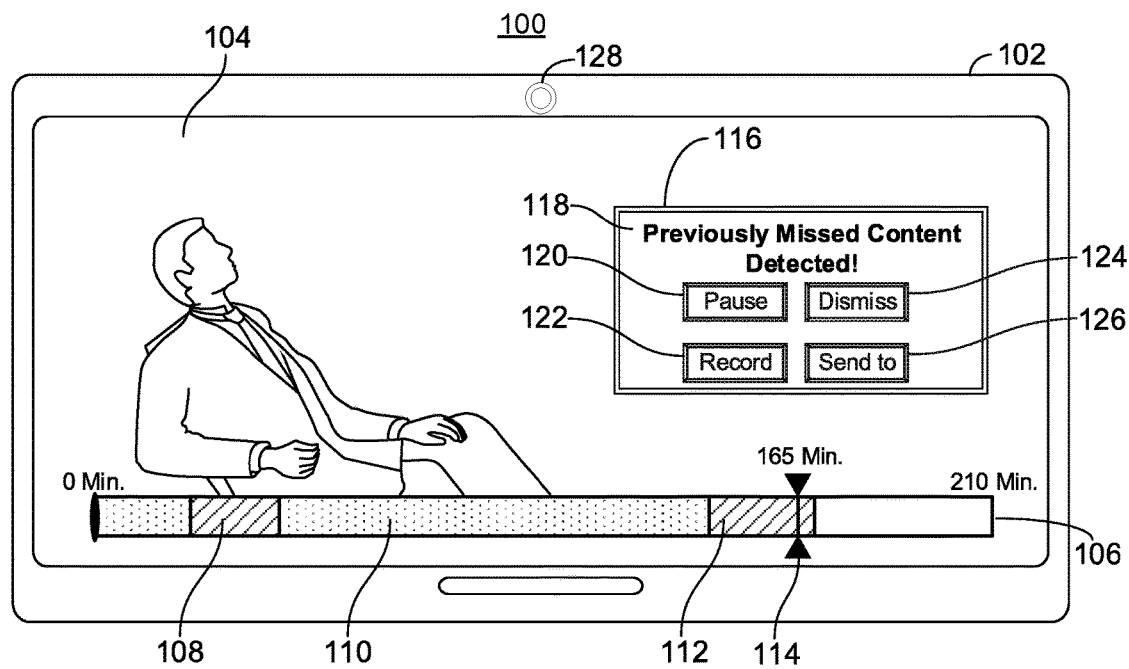
FIG. 1 shows an illustrative embodiment of a display screen including an alert that the user has previously missed content in a media asset, in accordance with some embodiments of the disclosure.

Systems and methods are described herein for a media guidance application that automatically alerts a user to maintain attention to a segment of media when the user has previously missed the segment. For example, users may oftentimes watch media while trying to perform other tasks, such as responding to emails or communicating with other users. Distractions caused by multitasking may cause users to miss content in media assets. Accordingly, users may re-watch the media asset to catch up on content that was previously missed. The media guidance application prevents a user from missing a previously missed segment for a second time by alerting the user to maintain attention to the media asset when the media guidance application detects that a user is distracted from the same segment during a second viewing of the media asset.

Specifically, the media guidance application may determine that a user missed a segment of a media asset during a first viewing of the media asset and may alert the user when the segment is played back during a second viewing of the media asset. For example, the media guidance application may receive a request to display a media asset, such as the television show "Game of Thrones," at a first time. The media guidance application may detect that the user is distracted while watching the television show during the first time. For example, the media guidance application may determine that a user is checking their phone during playback of the television show and may determine that because the user is checking their phone, they are distracted from viewing the media asset.

The media guidance application may store data identifying a segment of the media asset where the media guidance application determined that the user was distracted. For example, the media guidance application may determine that the user was distracted by their phone between the tenth and twelfth minutes of the media asset. Accordingly, the media guidance application may retrieve a profile associated with the user and may store data indicating the bounds of the segment where the user was distracted. For example, the media guidance application may retrieve a user profile and may store in a viewing history of the user an indication that the user viewed the show "Game of Thrones" and missed the segment of the television show between the tenth and twelfth minutes.

The media guidance application may receive a request to display the show at a second time, subsequent to the first time. For example, a month after a first viewing of the media asset (e.g., "Game of Thrones"), the media guidance application may receive a second request from the user to view the television show "Game of Thrones". In response to the request, the media guidance application may retrieve the television show "Game of Thrones" from a content provider and may generate for display the show "Game of Thrones".

The media guidance application may retrieve the user profile data indicating the segments of the television show that were missed by the user. The media guidance application may retrieve the user profile and may analyze the user profile to determine whether the user previously viewed "Game of Thrones". If the media guidance application determines, based on the profile data, that the user viewed the television show "Game of Thrones", the media guidance application may determine whether the profile indicates segments of the media asset that were missed by the user (e.g., between the tenth and twelfth minutes).

In response to detecting an indication of a segment that was previously missed by the user, the media guidance application may compare a playback position of the show to the position of the segments that were missed by the user. For example, the media guidance application may compare a playback position of a frame that is currently generated for display by the media guidance application with the position of the segment. When the media guidance application determines that a current play position corresponds to the position of the segment that was missed by the user, the media guidance application may monitor the user to determine whether the user is distracted once again during the segment. If the media guidance application determines that the user is distracted during the segment (e.g., because the media guidance application determines that the user is not within a viewing distance of a monitor displaying the media guidance application), the media guidance application may output an alert to the user so that the user can return to viewing the media asset without missing the segment once more.

In some instances, the media guidance application may communicate with a second user device associated with the user to determine whether the user is distracted. For example, the media guidance application may track a user's location using a wearable device that is associated with the user. The media guidance application may determine that the user is distracted from viewing the media asset when the user is outside of a threshold range of a first user device displaying the media asset. For example, the media guidance application may determine that the user is distracted when the user is different room than a room of the first device.

In some instances, the media guidance application may direct the second device to output the alert so that the user can be notified more effectively. For example, the media guidance application may determine that the user is outside of a room corresponding to the first user device (e.g., the device displaying the media asset) and may accordingly output the alert on the second device so that the user can effectively perceive the alert (e.g., because the user may not perceive alerts that are output in a different room).

In some instances, the media guidance application may pause or record the segment of the media asset so that the user can watch the segment at a later time (e.g., in a non-linear fashion for broadcast media assets). For example, the media guidance application may detect that the user is outside of the room of the first user device and may pause and record the media asset until the media guidance application detects that the user returns to the room of the first user device. The media guidance application may play back the segment of the media asset from the recording in response to detecting that the user reentered the room and can therefore perceive the segment of the media asset.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

Figure 4:
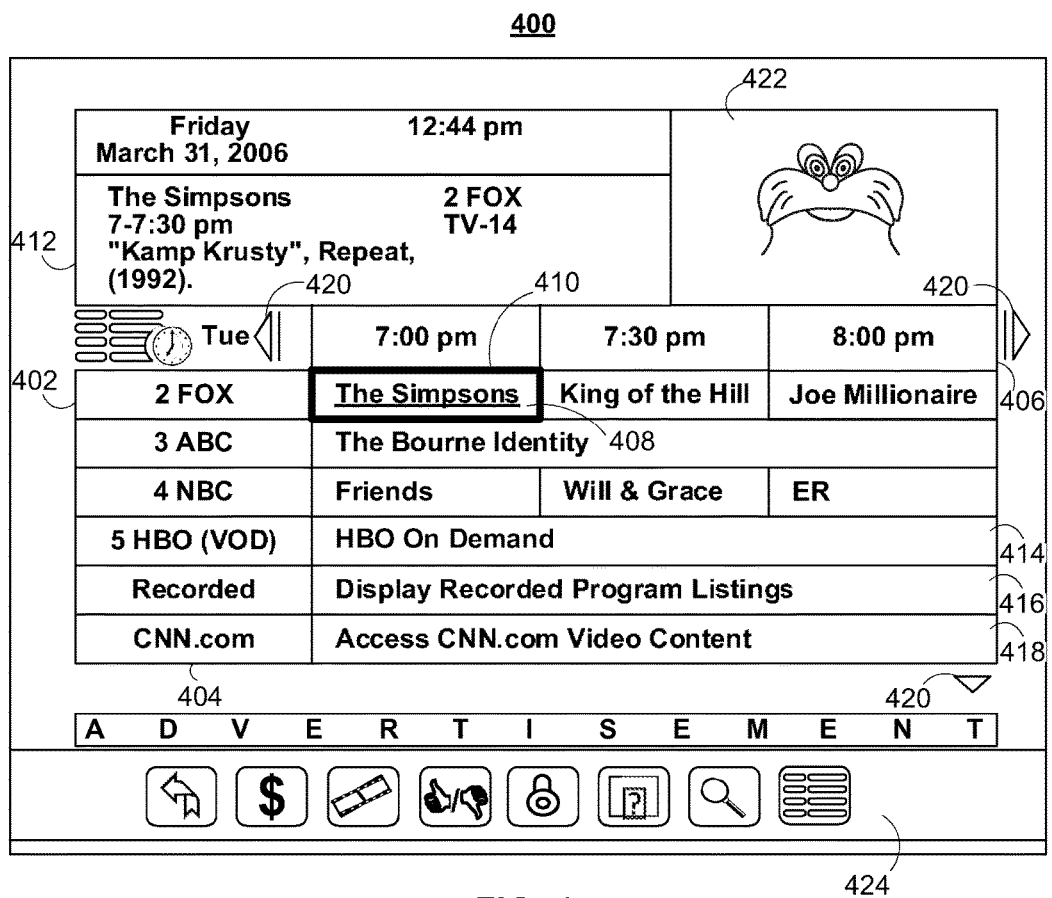
FIG. 4 shows an illustrative example of a media guidance display that may be presented in accordance with some embodiments of the disclosure.
Figure 5:
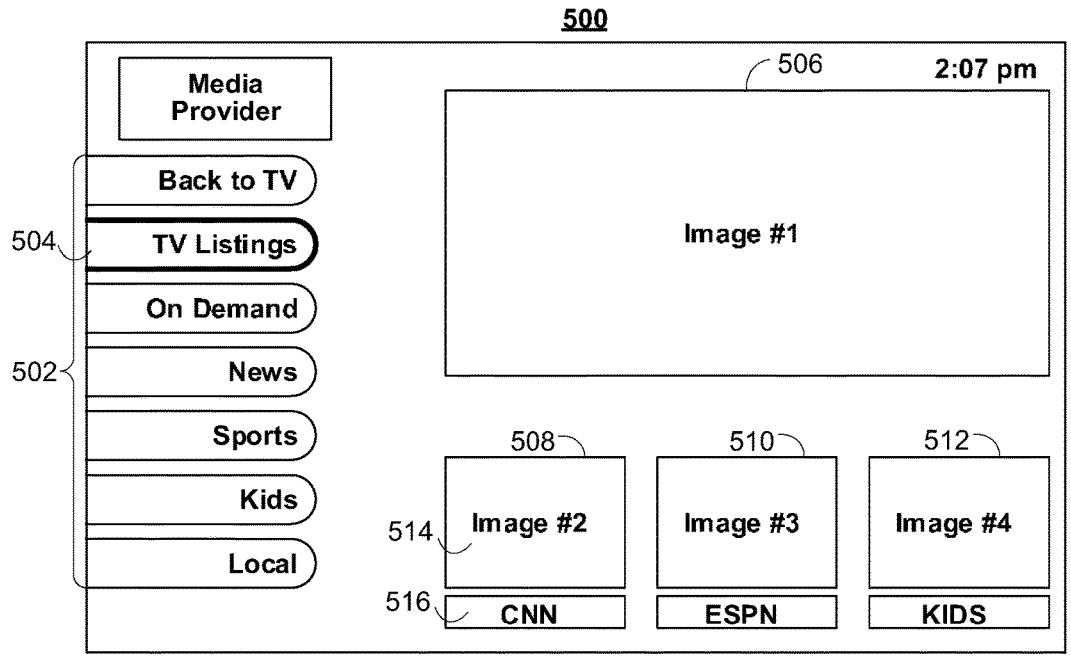
FIG. 5 shows another illustrative example of a media guidance display that may be presented in accordance with some embodiments of the disclosure.

One of the functions of the media guidance application is to provide media guidance data to users. FIGS. 1 and 4-5 show illustrative display screens that may be used to provide media guidance, and in particular media listings. The display screens shown in FIGS. 1 and 4-5 may be implemented on any suitable device or platform. While the displays of FIGS. 1 and 4-5 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), notification information (e.g., text, images, media clips, etc.), on-demand information, blogs, websites, and any other type of guidance data that is helpful for a user to navigate among and locate desired content selections.

In some embodiments, control circuitry 604, discussed further in relation to FIG. 6 below, executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays discussed in relation to FIG. 1, FIG. 4, and FIG. 5. In some implementations, any action performed by control circuitry 604 may be based on instructions received from the media guidance application.

As referred to herein, the term "in response to" refers to initiated as a result of. For example, a first action being performed in response to a second action may include interstitial steps between the first action and the second action.

As referred to herein, the term "directly in response to" refers to caused by. For example, a first action being performed directly in response to a second action may not include interstitial steps between the first action and the second action.

As referred to herein, the term "segment" of a media asset may refer to any part of a media asset that is distinguishable from another part of the media asset. For example, a segment may correspond to a frame, set of frames, scene, chapter, segment of time, portion, etc. The media guidance application may identify distinct segments based on time marks (e.g., a segment begins at a first time mark and ends at a second time mark) in the play length of a media asset. Alternatively or additionally, the media guidance application may identify segments based on a range of frames (a portion begins at a first frame and ends at a second frame). Alternatively or additionally, the media guidance application may identify segments based on content in the media asset (a segment may begin at the appearance of particular content and end at the appearance of the same or different content) that were at least partially missed by the user. Alternatively or additionally, the media guidance application may identify segments based on metadata associated with the media asset (a segment may begin at a first metadata tag and end at a second metadata tag).

As referred to herein, a "frame" may be any image associated with media. For example, a frame of a movie may be an image captured at a specific point in the movie. A movie may comprise a sequence of frames for playback in a specified order. The media guidance application may perform image processing on a frame of media to determine if there is important content in the media.

It will be appreciated that while the discussion of media content has focused on video content, the principles of media guidance can be applied to other types of media content, such as music, images, etc.

FIG. 1 shows an illustrative embodiment of a display screen including an alert that the user has previously missed content in a media asset. Display screen 100 is depicted having media asset 104 generated for display on display 102. Display 102 is depicted having camera 128 to track a user for determining whether a user is distracted. Display 102 is depicted comprising alert 116 which is alerting the user that content that was previously missed is detected. Alert 116 is depicted comprising message 118 describing the context of the alert, and four user-selectable options, pause option 120, record option 122, dismiss option 124 and send to option 126, for allowing the user to decide how the user wants to handle the alert. For example, in response to receiving a user selection of pause option 120, the media guidance application may pause display of media asset 104 on display 102; in response to receiving a user selection of record option 122, the media guidance application may record the segment of the media asset to a memory of the media guidance application; in response to detecting a user selection of dismiss option 124, the media guidance application may remove alert 116 overlying media asset 104; in response to receiving a user selection of send to option 126, the media guidance application may transmit the segment to a second device associated with the user, such as a tablet of the user.

FIG. 1 additionally depicts a time bar 106 colored in various colors to indicate portions of media asset 104 that were previously missed by the user. For example, the media guidance application may determine that the user previously missed segment 108 and segment 112 when previously viewing the media asset on display 102. The media guidance application may visually distinguish segments 108 and 112 from region 110 to indicate that the user missed content corresponding to segments 108 and 112 but not region 110. Additionally, time bar 106 is depicted as having playback indicator 114 which corresponds to a current playback position of media asset 104.

In the illustrative embodiment of FIG. 1 the media guidance application may generate for display media asset 104 in response to receiving a second user selection of media asset 104 for display on display 102. The media guidance application may generate for display time bar 106, comprising segments 108 and 112 in response to detecting that the user previously missed segments of media asset 104 from a profile associated with the user. The media guidance application may generate for display alert 116 in response to determining that the user is disregarding the segment of the media asset (e.g., segment 108 or 112 of media asset 104) at the playback position corresponding to playback indicator 114.

In some aspects, the media guidance application may generate for display to the user, during a first time period, the media asset. For example, the media guidance application may receive a user selection of a media asset, such as media asset 104 from a media guidance display, such as those depicted in FIGS. 4 and 5. For example, the media guidance application may detect an input on a touch screen associated with display 102 and may correlate a location of the received touch input to an element that is generated for display by the media guidance application on display 102. For example, the media guidance application may determine that the touch input corresponds to pixels having the coordinates (200, 300) on display 102. The media guidance application may identify a position of an element in the guidance display, such as those depicted in FIGS. 4 and 5, corresponding to the pixel at the coordinates (200, 300). The media guidance application may determine that the display element corresponding to the coordinates (200, 300) corresponds to a program listing associated with the media asset, such as media asset 104. In response to determining that the touch input corresponds to a program listing for media asset 104, the media guidance application may generate for display to the user on display 102, during a first time period (e.g., substantially soon after receiving the first touch input), the media asset (e.g., media asset 104).

The media guidance application may detect that the user is disregarding the segment of the media asset during the first period. For example, the media guidance application may generate for display the media asset, such as media asset 104 on display 102, and may determine that the user is disregarding the segment of the media asset when the media guidance application determines that the user is not directing their attention to display 102. For example, the media guidance application may utilize a camera of display 102, such as camera 128, to track the eye movement of the user. The media guidance application may determine that the user is disregarding the segment of the media asset when a gaze point of the user does not correspond to the display.

Figure 2:
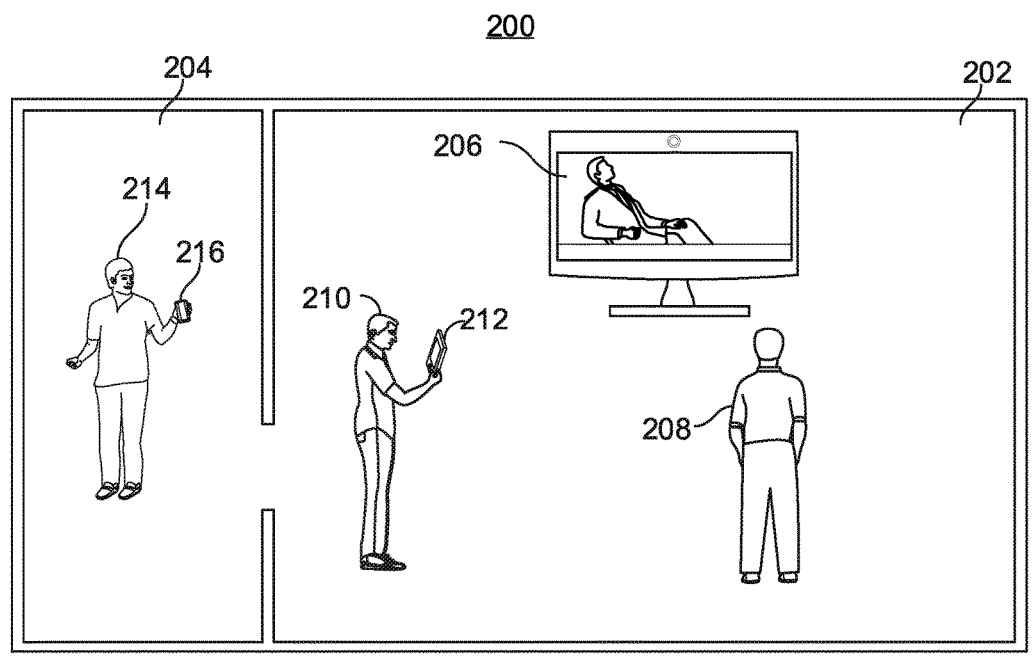
FIG. 2 shows an illustrative example of a user interaction with a media guidance system in accordance with some embodiments of the disclosure.

FIG. 2 depicts a user interaction with a media guidance system in accordance with some embodiments of the disclosure. For example, FIG. 2 depicts display 206 in main room 202. User 208 is depicted in room 202 facing display 206. User 210 is also depicted in main room 202 but is facing user device 212, disregarding the content on display 206. User 214 is depicted in secondary room 204 holding user device 216. In some embodiments, the media guidance application may be implemented on or may communicate with one or more of displays 102 and 206, and user devices 212 and 216. Display 206 may display any of the display screens depicted in FIGS. 1, 4 and 5 generated by the media guidance application. For example, the media guidance application may generate for display media asset 104, alert 116 and time bar 106 on display 206. In some embodiments, display 206 comprises a camera, such as camera 128, to determine whether a user is disregarding the media.

In some embodiments, the media guidance application may detect a user of a plurality of users using a camera of the media guidance application. For example, the media guidance application may utilize a camera associated with the media guidance application, such as camera 128, to detect faces of users consuming media generated for display by the media guidance application, such as users 208, 210 and 214. The media guidance application may use an edge detection algorithm to create a mapping for features on the face of each of user 108, user 110, and user 112 (e.g., by computing vectors between points corresponding to the position of eyes, mouth, etc.) and may compare the mapping to a database comprising mappings for the facial features for each of the users. For example, the media guidance application may compute a mapping for the face of user 108 detected using camera 128. The media guidance application may compare the mapping to stored facial mapping data in a profile associated with user 108. The media guidance application may determine that user 108 is associated with the profile when the computed mapping matches the stored facial mapping within a threshold amount (e.g., an acceptable degree of error).

The media guidance application may detect eye movement of the user and may approximate a gaze point based on the eye movement. For example, the media guidance application may monitor a gaze of a user, such as user 208, 210, or 214 during playback of the media asset. The media guidance application may monitor the gaze of the user by monitoring a vertical degree of an eye of the user, a horizontal degree of the eye of the user, and a position of the eye of the user relative to a display screen, such as display 102 or display 206. For example, the media guidance application may use a detector, such as camera 128, an infrared detector, contact lens detector, wearable camera, wearable technology, optical sensor, augmented reality glasses, camera of a portable user device (e.g., a smartphone or tablet) or any other suitable detector, to determine that the eye of the user is a computed distance from display 102 or 206 and that the eye of the user is aligned with the center of the screen during playback of the media asset. Furthermore, the media guidance application may track the position and movement of the eyes of the user to approximate a location to which the user is looking. For example, the media guidance application may further use the detector to determine that the eye of the user is at a horizontal angle of 10 degrees to the left of center and that the eye of the user is at a vertical angle of 15 degrees above center. The media guidance application may use the angles of the eye and the distance between the user and the display to approximate a location at which the user is looking. When the media guidance application determines that the location at which the user is looking corresponds to one of display 102 or 206, the media guidance application may determine that the user is not disregarding media asset 104.

In another example, the media guidance application may determine whether the user is disregarding the segment of the media asset based on tracked user interactions with a second user equipment associated with the user. For example, the media guidance application may determine that the user is disregarding the media asset based on a determination that the user is using second user equipment instead of paying attention to a display, such as display 102 or 206, corresponding to the media asset. In another example, the media guidance application may identify the users based on the presence of mobile devices associated with the users. For example, the media guidance application may communicate wirelessly (e.g., via communications path 712, described below in relation to FIG. 7) to a plurality of user devices, such as user device 212 and 216. The media guidance application may identify each user equipment device based on a unique identifier associated with each user equipment device. The media guidance application may retrieve a unique identifier for each device that is within a wireless range of display 102 (e.g., by querying each device within a wireless range, or by querying a centralized network device having a listing of all devices within a wireless range, such as a router). For example, the media guidance application may transmit a network packet requesting discovery of wireless devices (e.g., user equipment 212, user equipment 216 and display 102) within a range (e.g., on a same network) of the media guidance application (e.g., a media guidance application running on display 102). The media guidance application may retrieve a unique identifier associated with each of the devices in response to the network packet. The media guidance application may search a database of user profiles to identify a user associated with each of the devices that responded to the ping. For example, the media guidance application may retrieve a packet from user equipment 212 which uniquely identifies the device as user equipment 212. The media guidance application may search a database of user profiles to identify a user profile having a data field that matches the unique identifier of user equipment 212. In this example, the media guidance application may determine that the user profile comprising a data field comprising the unique identifier associated with user equipment 212 is user 210.

In some embodiments, the media guidance application may query the second user device, such as user equipment 212 and 216, to determine whether the user is directing their attention to the user equipment instead of display 206. For example, the media guidance application may transmit a query to user equipment 212 or 216 to determine whether the screen is turned on, whether the user is gazing at the device (e.g., by utilizing a camera of the user equipment), whether the user is typing on a keyboard of the user equipment, etc., because the media guidance application may determine that the user is disregarding the segment of the media asset when the user is directing their attention to the second device.

In some embodiments, the media guidance application may utilize the second user equipment to identify a location of the user to determine whether the user is disregarding the segment of the media. For example, the media guidance application may determine that a second user device associated with the user can approximate a location of the user with respect to a display displaying the media asset. The media guidance application may determine that the user is disregarding the media asset when the user is greater than a threshold distance from the display. For example, the media guidance application may determine that user 214 is disregarding the media asset (e.g., media asset 104) generated for display by the media guidance application on display 206 because user 214 is in room 204, where the user cannot perceive display 206. For example, the media guidance application may identify, based on the profile of the user, a second display device accessible to the user, such as a cell phone, tablet, headgear or other device associated with the user. For example, the media guidance application may transmit a network discovery packet over a network connection shared with a plurality of user equipment devices. The media guidance application may aggregate a list of user equipment that respond to the discovery packet. The media guidance application may determine whether a device of the aggregated list of devices is within a number of hops to the media guidance application to approximate whether a device is within a range of the first user equipment device. For example, the media guidance application may determine, that user equipment 212 is within the range of display 206, but that user equipment 216 is not within the range of display 206 based on a wireless signal strength between the user equipment. For example, the media guidance application may determine a first relative received signal strength (RSSI) of a wireless signal between display 206 and user equipment 212 and may determine a second RSSI of a wireless signal between display 206 and at user equipment 216. The media guidance application may determine, based on the first RSSI and the second RSSI an estimated distance between display 206 and user equipment 212 and between display 206 and user equipment 216. In another example, the media guidance application may measure received RF power over a shared wireless signal to estimate a location of the user. In another example, the media guidance application may utilize a GPS chip or another location circuitry to determine a location of the user.

In some embodiments, the media guidance application may retrieve a threshold maximum distance from memory and may compare the threshold maximum distance to a computed distance of the second device to determine whether the user is disregarding the segment of the media guidance application. For example, the media guidance application may compute that the distance between display 206 and device 212 is two meters, but the distance between display 206 and device 216 is ten meters. The media guidance application may receive a threshold maximum distance from memory (e.g., a distance between display 206 and a point in main room 202 that is farthest from display 206 to approximate the size of the room) of four meters. The media guidance application may compare the distance between display 206 and devices 212 and 216 to determine that user 214 is disregarding the media asset because the user is greater than the threshold maximum distance from display 206.

In some embodiments, the media guidance application may determine that the user is disregarding the media asset by, for example, analyzing a noise level of a room corresponding to a display, such as display 206 (e.g., a television displaying the media asset). The media guidance application may determine that the user is disregarding the media asset when the noise level is above a threshold maximum noise level (e.g., because when the noise is above the threshold maximum noise level the user may not hear the media asset).

In response to detecting that the user is disregarding the segment of the media asset during the first time period, the media guidance application may store, in a profile associated with the user, a position within the media asset corresponding to the segment of the media asset disregarded by the user and an indication that the user disregarded the segment of the media asset during the first time period. For example, the media guidance application may identify the user based on a second device, such as device 216 and 212, associated with the users 214 and 210, respectively, as described above. In another example, the media guidance application may store login credentials of the user in a memory local to the media guidance application. For example, the media guidance application may generate for display a login screen (e.g., on display 102 or 202) to the user to authenticate with the media guidance application. The media guidance application may receive input to the login screen via a remote control or another user input device, such as via a virtual keyboard on a touchscreen, a mouse and physical keyboard, etc. The media guidance application may process the login information and may transmit the login information to an authentication server to verify the identity of the user.

In some embodiments, the media guidance application may identify the user based on sound detected by the media guidance application. For example, the media guidance application may have access to a user input device, such as an integrated microphone capable of detecting sound waves. The media guidance application may monitor sound in main room 202 where display 206 is located. The media guidance application may filter the sound such that ambient noise, such as noise from a fan, or noise generated by the media guidance application itself, such as sound generated from speakers of display 206 accessible to the media guidance application, are filtered out by the media guidance application. The media guidance application may detect that the user (e.g., user 208) is present in the room when the media guidance application detects sound from a voice of user 208. For example, the media guidance application may compute a fingerprint for a detected sound based on a pitch, frequency, etc., of the detected sound performing the filtering as described above. The media guidance application may compare a fingerprint for the voice with a database comprising fingerprints for users to identify a user matching the fingerprint. For example, the media guidance application may generate a fingerprint as described above and may compare the fingerprint to the database to determine that the fingerprint corresponding to user 208 differs from the generated fingerprint by less than a threshold amount (e.g., an acceptable degree of error).

In some embodiments, the media guidance application may compare the identity of the user with a database comprising the user profiles and may receive a pointer to a profile if one is located or may receive a NULL value if the profile does not exist. The user profile database may be located remote or local to the media guidance application (e.g., on storage 608 or on media guidance data source 718 accessed via communications network 714 described in relation to FIG. 6 and FIG. 7 below).

In some embodiments, if a user profile is located, the media guidance application may access database entries corresponding to a user's viewing history. For example, the user's viewing history may comprise information corresponding to media assets that were previously accessed by the user. Exemplary data that may be retrieved from the user profile is depicted further with respect to FIG. 3.

FIG. 3 depicts an exemplary data exchange format that the media guidance application may utilize to format data for storing in the profile of the user with the indication that the user missed the segment of the media asset. For example, FIG. 3 is depicted having data fields 302. Data fields 302 include data indicating a "userNum" including a unique identifier for the user, an "assetType" indicating the type of the media asset, a "title" field to store the title of the media asset, a "mediaID" field indicating a unique identifier for the media asset, a "lastWatched" field indicating when the user last watched the media asset (either in part or in its entirety), and data indicating segments that were missed by the user. As depicted in FIG. 3 the "missedSegments" array may comprise data to identify missed segments, such as a "start" field, indicating a start time for the segment within the media asset, an "end" filed indicating an end time for the segment within the media asset, a "description" field indicating an attribute of the segment, such as the content that appears in the segment such as a character death or a famous scene, and a "missedOn" field indicating a date when the user missed the portion. The data exchange format of FIG. 3 is merely exemplary and any other suitable method for storing an indication that the user missed a segment may be used. For example, the media guidance application may store an indication that the user missed the segment in a database associated with the media asset, such as a database of a content provider of the media asset instead of storing the indication in the profile of the user. In another example, the media guidance application may store the indication of the missed segment in a database unique to storing said indications. For example, the media guidance application may identify a database established for specifically storing indications of missed segments of a media asset independent from the user profile.

In response to detecting that the user is disregarding the segment of the media asset during the first time period, the media guidance application may store, in a profile associated with the user, a position within the media asset corresponding to the segment of the media asset disregarded by the user and an indication that the user disregarded the segment of the media asset during the first time period. For example, the media guidance application may determine an identity for the user (e.g., using login credentials provided to the media guidance application as discussed above) and may retrieve a profile from memory associated with the identified user. The media guidance application may store, in the profile, data indicating the media asset selected by the user (e.g., "The Godfather") and data indicating the portions of the media asset where the media guidance application determined that the user was distracted. For example, the media guidance application may determine that the user is distracted during minutes 20-39 of the "The Godfather" and between minutes 150 and 175 of "The Godfather". The media guidance application may generate an array to store the data in the profile of the user that indicates the missed segments. For example, the media guidance application may generate an array such as the "missedSegments" array depicted in FIG. 3 and may store the array in the profile of the user.

The media guidance application may utilize the array, retrieved from the user profile to identify whether and what segments of a media asset were missed by the user. For example, the media guidance application may determine that the user watched the movie "The Godfather" based on data retrieved from a viewing history of media requested by the user, such as the exemplary data indicated in FIG. 3. In some examples, the media guidance application may retrieve an array of media previously consumed by the user instead of a single entry. The media guidance application may search the array to determine whether the media requested by the user in the second time period was previously accessed by the user.

In another example, the media guidance application may determine that the user was not distracted when consuming a media asset if, in the profile of the user, the media guidance application determines that user profile data associated with the media asset does not comprise an indication that the user missed any segment of the media asset. For example, the media guidance application may retrieve, from the profile of a user, data indicating that the user previously consumed the movie "Remember the Titans". The media guidance application may analyze the data in the profile of the user associated with "Remember the Titans" and may determine that the data does not include an array indicating missed segments and therefore the media guidance application may determine that the user did not miss any segments of "Remember the Titans".

The media guidance application may generate for display to the user, during a second time period subsequent to the first time period, the media asset beginning at a time in the media asset preceding a missed segment. For example, the media guidance application may generate for display the program guide as described above. The media guidance application may detect a user selection of the media asset at a second time (e.g., a week after the user first selected the media asset). For example, the media guidance application may receive the user selection of the media asset (e.g., "The Godfather") and may retrieve data from the user profile associated with the media asset (e.g., the data depicted in FIG. 3). The media guidance application may determine, based on the data in the profile, that the user last consumed the media asset on Feb. 7, 2018. Accordingly, the media guidance application may determine that the user requested the media asset during a second time period when a current date or time is later (e.g., Feb. 9, 2018) than a date or time stored in the user profile (e.g., Feb. 7, 2018, as stored in a "lastWatched" field as depicted in FIG. 3). Conversely, the media guidance application may determine that the user selection corresponds to a first period of time when the media guidance application determines that the media asset is not in the profile of the user. For example, the media guidance application may determine that the user has not viewed the media asset "Alice in Wonderland" because the movie title "Alice in Wonderland" is not in the user profile (e.g., stored as part of the exemplary user profile data in FIG. 3).

The media guidance application may generate for display the media asset at a time in the media asset preceding the segment. For example, the media guidance application may determine that the segment begins at minute 20 of the media asset. The media guidance application may therefore begin playback of the media asset at a point preceding or equal to the beginning of the segment (e.g., minute 20 or earlier). The media guidance application may generate for display the media asset on display 102, display 206 or any other display accessible to the media guidance application. The media guidance application may generate for display the media asset. For example, the media guidance application may receive a second user selection of "The Godfather" from a program guide associated with the media guidance application. For example, the media guidance application may generate for display the media asset at a beginning of the media asset (e.g., at a first scene of the media asset). In response to receiving the user selection of "The Godfather" from the displayed program guide, the media guidance application may generate for display the media asset by, for example, requesting a copy of the media asset from a server of a content provider associated with the media asset. For example, the media guidance application may determine that the media asset is available from a video-on-demand library or from an OTT provider. Accordingly, the media guidance application may request the media asset from the video-on-demand library or the OTT provider by transmitting a request to the content provider and comprising a unique identifier for the media asset (e.g., a serial number or a title and year associated with "The Godfather"). In response to transmitting the request, the media guidance application may receive, from the content provider, the media asset (e.g., "The Godfather").

In some embodiments, the media guidance application may transmit, in the request, an indication of the start time within the media asset (e.g., a beginning of a segment, such as segment 108 or segment 112). In response to transmitting the request, the media guidance application may receive the media asset beginning at the requested start time.

The media guidance application may determine, based on the profile of the user, whether the user has previously accessed the media asset. For example, as described above, the media guidance application may update a profile, whenever the media guidance application detects a user input requesting the media asset, to reflect that the user has requested the media asset. The media guidance application may retrieve a viewing history from the user profile to determine whether the user previously accessed the media asset. For example, the media guidance application may retrieve data from the profile, such as the exemplary data of FIG. 3 and the media guidance application may determine that the data indicates that the user previously viewed the media asset (e.g., based on a "title" field of the user profile indicating that the user previously viewed a media asset titled "The Godfather"). The media guidance application may compare an identifier of the media asset selected during the second time period to the data in the viewing history to determine whether the user previously viewed the selected media asset (e.g., the media guidance application may compare the title of the selected media asset, "The Godfather", to the viewing history to determine whether "The Godfather" is in the viewing history).

In response to determining that the user previously accessed the media asset, the media guidance application may retrieve, from the profile, the indication that the user disregarded segment of the media asset and the position within the media asset corresponding to the segment of the media asset. For example, in response to determining that "The Godfather" is in the viewing history of the user, the media guidance application may retrieve, from the profile, data indicating segments of "The Godfather" missed by the user. For example, the media guidance application may receive the exemplary profile data depicted in FIG. 3 and may detect that the data associated with "The Godfather"

comprises an array of missedSegments. In response to determining that the user profile data associated with the media asset comprises a segment missed by the user, the media guidance application may retrieve the start and end times associated with the missed segments. For example, the media guidance application may retrieve the start time of 20 min and an end time of 39 min for a first segment (e.g., segment 108) and a start time of 150 and end time of 175 for a second segment (e.g., segment 112).

The media guidance application may determine, during the second time period, whether a play position in the media asset corresponds to the position of the segment. For example, the media guidance application may track a play position of the media asset generated for display by the media guidance application on a display screen, such as display 102 or display 206. For example, the media guidance application may generate for display a visual indication of the current playback position by, for example, generating for display playback indicator 114 on time bar 106. For example, the media guidance application may determine that the current playback position of the media asset is 165 min and may resultantly generate for display playback indicator 114 at a position in the time bar corresponding to the current playback position.

In some embodiments, the media guidance application may determine that the play position in the media asset corresponds to the play position of the segment when the play position of the media asset is within a maximum threshold amount of time to a beginning or an ending of the segment. For example, the media guidance application may determine that the start time for the segment is five min with respect to the media asset. The media guidance application may determine that when the play position is less than two min away from the beginning of the segment, the media guidance application may determine that the play position corresponds to the position of the segment (e.g., to give a user ample time to respond to the alert and not miss any content in the segment).

The media guidance application may compare the current playback positions to position of the segments of the media asset that were missed by the user. For example, the media guidance application may determine that the second segment of the media asset missed by the user spans minute 150 to minute 175 of the media asset (e.g., by retrieving data from the user profile indicating the beginning and the ending of the segment). The media guidance application may compare the current playback position to the start and end times of the segment to determine whether the current playback position corresponds to the segment. For example, when current playback position (e.g., 165 min.) is greater than and/or equal to the start time (e.g., 150 min) of the segment (e.g., segment 112) and is less than or equal to the end time (e.g., 175 min) of the segment (e.g., segment 112) the media guidance application may determine that the current playback position corresponds to the segment (e.g., the media guidance application is currently generating for display the segment). When the media guidance application determines that the media guidance application is currently generating for display the segment, the media guidance application may track the behavior of the user to determine whether the user is disregarding the segment a second time; and, if the media guidance application determines that the user is disregarding the segment the second time, the media guidance application may alert the user to maintain attention to the segment.

In contrast, the media guidance application may determine that the playback position does not correspond to the segment, the media guidance application may determine that the user did not miss the portion. For example, when the media guidance application may determines that the current playback position is not greater than and/or equal to the start time of the segment and the playback position is not less than or equal to the end time of the segment, the media guidance application may determine that the user has not missed the segment and may not track the behavior of the user.

In some embodiments, the media guidance application may determine whether the current playback position corresponds to the segment based on flags in metadata of the media asset received from the content provider. For example, the media guidance application may receive metadata in a content stream of the media guidance application from the content provider. The media guidance application may detect flags in the metadata indicating portions of the media asset that were previously missed by the user. For example, the media guidance application may detect, in a program specific information (PSI) header of a MPEG-4 packet, data indicating that a frame corresponding to the packet of the stream is part of the segment. Based on detecting the flag in the PSI header, the media guidance application may determine that the playback position corresponding to the frame indicated in the packet is within the segment. When the media guidance application generates for display the frame, the media guidance application may determine that the current playback position corresponds to the segment. These means for identifying whether the current playback position of the media asset corresponds to the segment are merely illustrative, and numerous other methods of identifying may be possible without a departure from the scope of the present disclosure.

In some embodiments, the media guidance application may generate for display a visual indication of the segments missed by the user during the first time period. For example, the media guidance application may visually distinguish segments 108 and 112 from the remainder of the time bar (e.g., time bar 106) so that so that the user can quickly jump to a previously missed portion or know when an important portion is upcoming when, for example, the media guidance application detects a user selection of one of the segments (e.g., by detecting a fast-forward command to change a playback position of the media asset to the segment).

In response to determining that the play position of the media asset corresponds to the position of the segment, the media guidance application determines whether the user is disregarding the media asset during the second time period (e.g., the time period when the user is viewing the media asset for the second time). For example, the media guidance application may utilize any of the detection methods described above, such as using a camera, such as camera 128, to track a user's body or eye movement; using a second device of the user to determine whether the user is distracted by using the device; or by detecting a noise level associated with a room, such as main room 202 associated with the media guidance application (e.g., when the media guidance application is implemented on user equipment having access to display 206).

In response to determining that the user is not disregarding the media asset during the second period, the media guidance application may not alert the user because the alert would not be necessary to prevent the user from missing a viewing of the segment for a second time. For example, the media guidance application may not generate an alert for user 208 if the media guidance application determines that user 208 is not disregarding a media asset generated for display by the media guidance application on display 206. In contrast, the media guidance application may determine that users 210 and 214 are distracted from the media asset by user devices 212 and 216, respectively. Accordingly, media guidance application may output an alert for users 210 and 214 so that the users do not miss the segment for a second time.

In response to determining that the user is disregarding the media asset during the second time period, the media guidance application may output the alert to the user, based on the indication, that the segment was previously missed by the user so that the user can direct their attention to the segment of the media asset. For example, the media guidance application may output a visual alert, such as alert 116, indicating to the user that the user previously missed content in the media asset (e.g., media asset 104).

In some embodiments, the media guidance application may present a plurality of options to the user in the alert. For example, the media guidance application may generate for display pause option 120, record option 112, dismiss option 124, and send to option 126. Alternatively or additionally, the media guidance application may output options 120, 112, 124 and 126 audibly. For example, the media guidance application may audibly prompt the user whether the user would like to pause the media asset (e.g., by generating the question "Would you like to pause the media asset?" using a text-to-speech algorithm and outputting the resultant audio signal to a speaker of the media guidance application). In response to outputting an audible query, the media guidance application may enable a microphone of the media guidance application and may await an audible user selection of the option. For example, the media guidance application may await a voice input on the microphone of "Yes", "No", "Pause", "Next Action". For example, the media guidance application may receive a soundwave input via a microphone of the media guidance application. The media guidance application may process the sound wave using a voice-to-text algorithm to convert the voice signal to a text prompt. Accordingly, the text prompt may be compared to template answers to identify a next action for the media guidance application. For example, the media guidance application may match the voice input "Next Action" to a template comprising the text "Next Action." In response to matching the voice input to the template, the media guidance application may perform an action associated with the template. For example, the media guidance application may perform an action that prompts the user with the next possible option (e.g, a record option), in response to determining that the user audibly requested the "Next Action".

In some embodiments, the media guidance application determines that the user is disregarding the media asset when the user is playing a game on a second user device, such as a smartphone. The media guidance application may generate an audible alert, such as a beep or a spoken message to attract the user's attention to the display (e.g., a monitor displaying the segment of the media asset that was previously missed by the user) or may generate for display a visual alert, such as a text message on a display associated with the second user device.

In some embodiments, the media guidance application may interrupt an activity on a second user device that the media guidance application determines is distracting the user from the media asset. For example, the media guidance application may determine that the user is distracted by a game on a smartphone of the user. In response to determining that the user is distracted from viewing the media asset based on the game, the media guidance application may transmit a request to the user device to interrupt the game to output the alert on the second device.

In some embodiments, the media guidance application may output the alert on a second user device in response to determining that the user is directing their attention to the second user device while the segment of the media asset is simultaneously generated for display on the first device. For example, the media guidance application may generate for display the media asset on a television accessible to the media asset. The media guidance application may determine that the user is directing their attention to the second device based on determining that the second device is greater than a threshold distance away from the first device. In response to determining that the second device is greater than the threshold distance away from the first device, the media guidance application may output the alert on the second device (e.g., so that the user can perceive the alert).

In some embodiments, the media guidance application may generate for display a selectable option for outputting the segment of the media asset on the second device. For example, the media guidance application may generate an alert on a smartphone of the user including a notification of the missed segment and an option to display the media asset on the second device instead or concurrently with the first device. For example, the media guidance application may generate for display on the second device the segment in response to receiving a user selection of the option.

In some embodiments, the media guidance application may store data indicating media assets previously consumed by the user and may store a listing of the media assets in the profile of the user. The media guidance application may utilize the stored list of previously consumed media assets to identify preferences of the user. For example, the media guidance application may analyze the user profile data to identify a user preference from the user profile, wherein the user preference identifies a media characteristic of interest to the user. For example, the media guidance application may analyze the listing of media previously viewed by the user based on genre. The media guidance application may enumerate the genres corresponding to each entry in the list to identify a genre most viewed by the user. Alternatively, the media guidance application may access user profile data provided by a user which explicitly details the user's preferences. For example, the media guidance application may determine that the user has already provided a listing of preferred media. In an example, the media guidance application may determine that a user has a preference for sports by determining that a listing of favorite channels manually entered by the user comprises only sports channels.

In some embodiments, the media guidance application may retrieve, from the profile of the user, a list of attributes of content that are important to the user. For example, the media guidance application may retrieve from the user profile preferences of the user that indicate that the user does not like gory content but likes sports content. The media guidance application may determine attributes of content associated with the segment of the media asset. For example, the media guidance application may perform analysis on closed captioning data associated with a frame of the segment to determine attributes associated with the frame. For example, the media guidance application may determine that when the media guidance application detects that the closed captions contain the text "Gunshots", that content in the frame is gory and when the closed captions contain the text "Baseball Score" that content in the frame is related to a baseball game.

In some embodiments, the media guidance application may determine whether an attribute of the content associated with the segment matches an attribute of content that is important to the user. For example, the media guidance application may determine the attributes of a frame of the segment to determine attributes associated with the segment. For example, the media guidance application may perform an image processing algorithm on the frame to determine whether the frame comprises any objects. The media guidance application may compare the objects to an object database to determine a context for the object. For example, the media guidance application may identify a baseball bat, a baseball and an umpire. Based on detecting the objects in the frame, the media guidance application may utilize a neural network to generate a best guess of the context of the frame, (e.g., that the frame corresponds to a baseball game).

In another example, the media guidance application may compare the attributes of the frame (e.g., metadata identifying the frame as corresponding to a baseball game) with attributes that are important to the user (e.g., sports content) and may output the alert to the user when the content associated with the segment match the attributes of the content that are important to the user. For example, the media guidance application may output an alert to the user when the content that was missed by the user comprises baseball content because sports content is important to the user and therefore the media guidance application may determine that the user would likely not want to miss the segment.

In some embodiments, the media guidance application suppresses the alert to the user in response to determining that the attributes of the content associated with the segment do not match the attributes of the content that are important to the user. For example, the media guidance application may provide the alert to the user to prevent the user from missing a segment of content that was previously missed by the user. When the media guidance application determines that the segment comprises content that is not important to the user (e.g., content that the user does not prefer watching), the media guidance application may suppress the alert because the user may find the alert annoying or intrusive when alerting about content not important to the user.

In another embodiment, the media guidance application may determine that the segment comprises content that is not important to the user and may allow for the user to skip the content because the user may have intentionally disregarded the content during the first time period. For example, the media guidance application may determine that the segment comprises gory content. The media guidance application may compare the attribute (e.g., gory content) to the attributes that are important to the user (e.g., sports content) and may not output the alert when the segment is directed to content that is not important to the user (e.g., because the user may not be interested in viewing content that they do not find important, or because the segment may contain content that the user dislikes).

In some embodiments, the media guidance application may output an option for the user to skip the segment of the media asset in response to determining that attributes of the segment of the media asset do not match attributes of content that are important to the user. For example, the media guidance application may determine that the segment contains gory content and may determine that the user does not find gory content important (e.g., because the user has an express dislike for gory content). In response to determining that the segment comprises content that is disliked by the user, the media guidance application may output an option for the user to skip the segment. For example, the media guidance application may output an audible alert that the segment has gory content (e.g., based on detecting gory content in a frame, or closed captioning data of the segment) and may prompt the user as to whether the media guidance application should skip the segment or generate for display the segment. In response to receiving a user input selecting the option to skip the segment (e.g., via a voice prompt), the media guidance application may skip the segment. For example, subsequent to receiving the user selection, the media guidance application may identify an end time for the segment, based on the user profile, and may generate for display a frame of the media asset corresponding to the end time for the segment.

In some embodiments, in response to determining that the user is disregarding the alert, the media guidance application may concurrently record the segment of the media asset to memory and generate for display the segment. For example, the media guidance application may receive the media asset from a tuner accessible to the media guidance application. The media guidance application may store video data received via the tuner to a memory accessible to the media guidance application and may concurrently generate for display the media asset on a display accessible to the media guidance application.

In some embodiments, the media guidance application may determine that the user is directing attention to the alert subsequent to the generating for display the media asset. For example, the media guidance application may determine that the user disregarded the segment of the media asset and may determine that the user directed attention to the media asset after the segment was generated for display by the media guidance application (e.g., after the user already missed the segment for a second time).

In response to determining that the user is directing attention to the alert subsequent to the generating for display the segment, the media guidance application may retrieve the media asset from memory and may generate for display the retrieved media asset. Concurrently, the media guidance application may buffer frames of the media asset that are subsequent to the segment so that the user may consume the media asset in a time-shifted continuous manner after generating for display the segment. For example, the media guidance application may determine that the user has directed their attention to the media asset after the media guidance application generated for display the segment.

In response to determining that the user directed their attention to the media asset after the segment was generated for display by the media guidance application, the media guidance application may play back the segment of the media asset from a version stored in the memory. Concurrently, while generating for display the segment, the media guidance application may cache portions of the media asset following the segment so that the user can view the media asset in a continuous manner immediately following viewing the segment. For example, the media guidance application may retrieve a segment of "The Godfather" that was missed by the user during the first time period and the second time period from the memory and may generate for display the segment when the media guidance application determines that the user is paying attention to the media asset.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 424. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 424 may allow the user to access different types of content, media guidance application displays, and/or media guidance application features. Options region 424 may be part of display 400 (and other display screens described herein), or may be invoked by a user by selecting an on-screen option or pressing a dedicated or assignable button on a user input device. The selectable options within options region 424 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
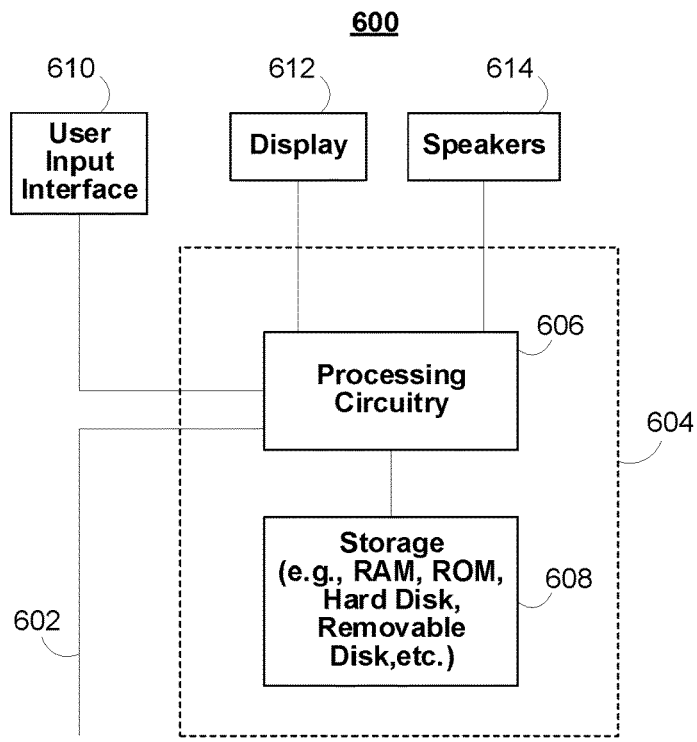
FIG. 6 is a block diagram of an illustrative user equipment device in accordance with some embodiments of the disclosure.
Figure 7:
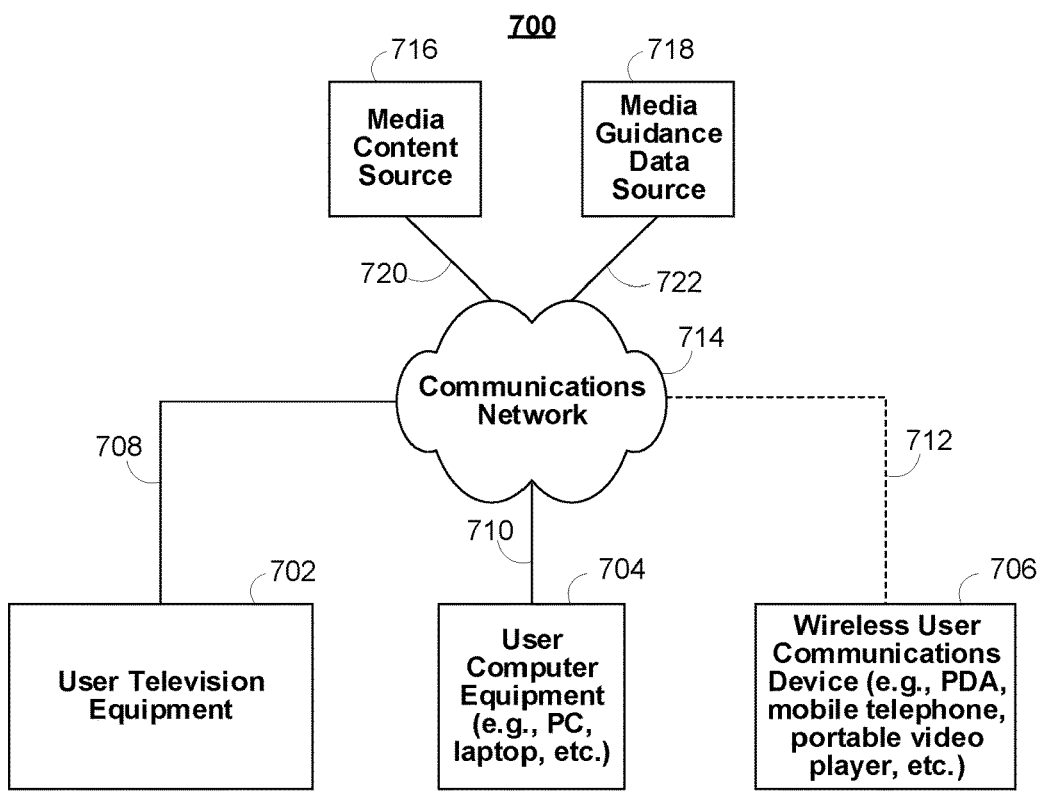
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

Figure 8:
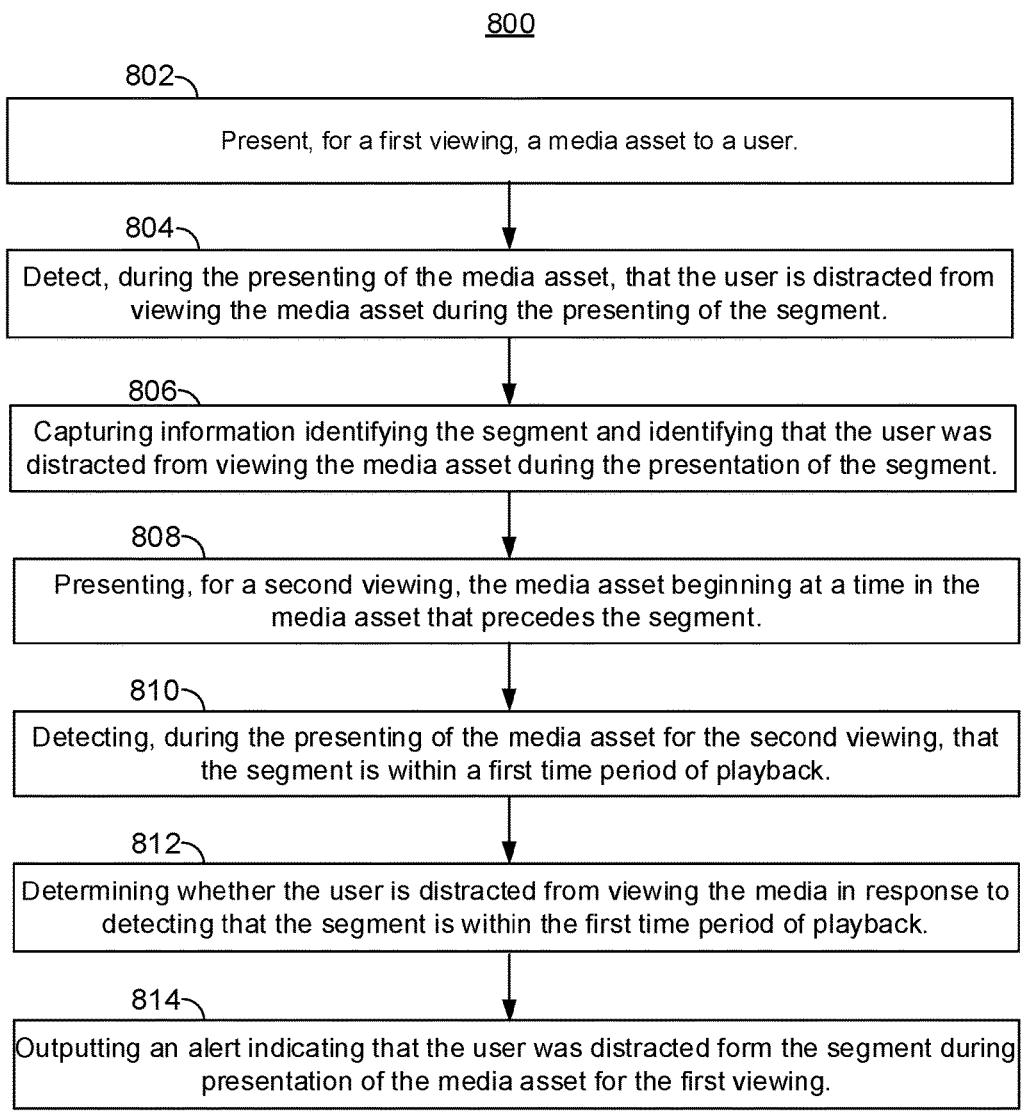
FIG. 8 depicts an illustrative process for alerting a user to a segment of media that was previously missed by the user, in accordance with some embodiments of the disclosure.

FIG. 8 is a flowchart of illustrative steps for alerting a user to segments of media that were previously missed by the user, in accordance with some embodiments of the disclosure. For example, a media guidance application implementing process 800 may be executed by control circuitry 604. In some embodiments, instructions for executing process 800 may be encoded onto a non-transitory storage medium (e.g., storage 608) as a set of instructions to be decoded and executed by processing circuitry (e.g., processing circuitry 606). Processing circuitry may, in turn, provide instructions to other sub-circuits contained within control circuitry 604, such as the tuning, video generating, encoding, decoding, encrypting, decrypting, scaling, analog/digital conversion circuitry, and the like. It should be noted that process 800, or any step thereof, could be performed on, or provided by, any of the devices shown in FIGS. 1 and 6-7.

Process 800 begins at 802, where the media guidance application running on control circuitry 604 presents for a first viewing a media asset to a user. For example, control circuitry 604 may receive a user input via user input interface 610 selecting a media asset of plurality of media asset listings generated for display by control circuitry 604 on display 612, display 206, and/or display 102. In response to receiving the user selection, control circuitry 604 may identify a media asset corresponding to the media asset listing. For example, control circuitry 604 may correlate the user selection with a media asset listing for "The Godfather". Accordingly, control circuitry 604 may request "The Godfather" from a content provider associated with the program listing. For example, control circuitry 604 may transmit a request for "The Godfather" via communications network 714 for "The Godfather" stored on media content source 716. When control circuitry 604 receives video data corresponding to "The Godfather", control circuitry 604 may generate for display "The Godfather" on a display, such as display 612, 102 or 206.

At 804, control circuitry 604 detects, during the presenting of the media asset, that the user is distracted from viewing the media asset during the presenting of the segment. For example, control circuitry 604 may access a camera, such as camera 128, via user input interface 610. Control circuitry 604 may process images received from camera 128 to determine a position of a user viewing the media asset. Control circuitry 604 may determine that the user is distracted from viewing the media asset when control circuitry 604 determines, using camera 128, that the user is not looking at a display screen presenting the media asset, such as one of displays 102, 206, and 612.

At 806, control circuitry 604 captures information identifying the segment and identifying that the user was distracted from viewing the media asset during the presentation of the segment. For example, control circuitry 604 may retrieve a profile of the user (e.g., by authenticating a user as described above with respect to FIG. 2, and may retrieve the user profile from storage 608 or media guidance data source 718. Control circuitry 604 may store information identifying the segment, such as a start and end time of the segment, and data identifying that the user was distracted from the segment, in a profile of the user. For example, control circuitry 604 may store data in the profile of the user identifying a start and end time of the segment that control circuitry 604 determined that the user was distracted while viewing.

At 808, control circuitry 604 presents, for a second viewing, the media asset beginning at a time in the media asset that precedes the segment. For example, control circuitry 604 may determine that the segment begins at the fifth minute of the media asset. Control circuitry 604 may generate for display the media asset at the fifth minute or earlier so that control circuitry 604 gives the user the opportunity to view the segment.

At 810, control circuitry 604 detects, during the presenting of the media asset for the second viewing, that the segment is within a first time period of playback. For example, control circuitry 604 may determine that the segment is within a period that is currently being played back by control circuitry 604. For example, control circuitry 604 may compare a current playback position (e.g., playback position 114) to a position of the segment in the media asset. If control circuitry 604 determines that the playback position corresponds to the position of the segment in the media asset, control circuitry 604 may determine that the segment is within the first time period.

At 812, control circuitry 604 determines whether the user is distracted from viewing the media in response to detecting that the segment is within the first time period of playback. For example, control circuitry 604 may utilize any of the methods for determining whether the user is distracted from viewing a media asset as discussed above. For example, control circuitry 604 may track a user's usage of their mobile device. When control circuitry 604 determines that the user is active on their mobile device during playback of the media asset, control circuitry 604 may determine that the user is distracted from viewing the media asset.

At 814, control circuitry 604 outputs the alert indicating that the user was distracted from viewing the segment during presentation of the media asset for the first viewing. For example, control circuitry 604 may output the alert in response to determining that the user was distracted during a second viewing of the segment. For example, control circuitry 604 may output a visual alert, such as alert 116 on display 612, or may output an audible alert such as a beeping noise from speaker 614.

It is contemplated that the steps or descriptions of FIG. 8 may be used with any other embodiment of this disclosure. In addition, the descriptions described in relation to the algorithm of FIG. 8 may be done in alternative orders or in parallel to further the purposes of this disclosure. For example, conditional statements and logical evaluations may be performed in any order or in parallel or substantially simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 8 may be implemented on a combination of appropriately configured software and hardware, and that any of the devices or equipment discussed in relation to FIGS. 1, 6, and 7 could be used to implement one or more portions of the process.

Figure 9:
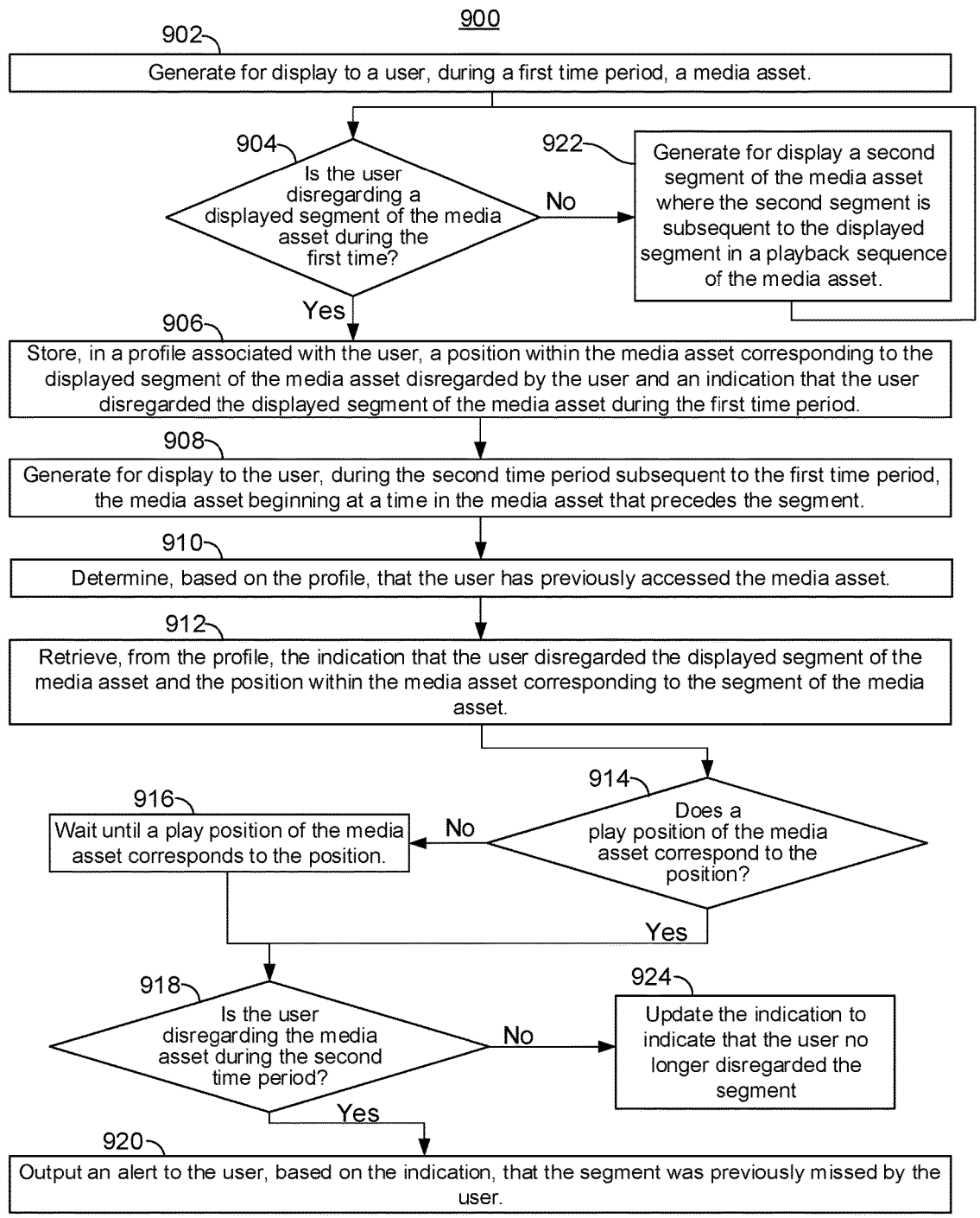
FIG. 9 depicts another illustrative process for alerting a user to a segment of media that was previously missed by the user, in accordance with some embodiments of the disclosure.

FIG. 9 is a flowchart of illustrative steps for alerting a user to segments of media that were previously missed by the user, in accordance with some embodiments of the disclosure. For example, a media guidance application implementing process 900 may be executed by control circuitry 604. In some embodiments, instructions for executing process 900 may be encoded onto a non-transitory storage medium (e.g., storage 608) as a set of instructions to be decoded and executed by processing circuitry (e.g., processing circuitry 606). Processing circuitry may, in turn, provide instructions to other sub-circuits contained within control circuitry 604, such as the tuning, video generating, encoding, decoding, encrypting, decrypting, scaling, analog/digital conversion circuitry, and the like. It should be noted that process 900, or any step thereof, could be performed on, or provided by, any of the devices shown in FIGS. 1, 6, and 7.

Process 900 begins at 902, where the media guidance application running on control circuitry 604 generates for display to a user, during a first time period, a media asset. For example, control circuitry 604 may receive a user selection of a media asset, such as "The Godfather," and may generate for display the media asset on a display screen associated with control circuitry 604, such as display 612, display 102, or display 206.

At 904, control circuitry 604 determines whether the user is disregarding a displayed segment of the media asset during the first time. For example, control circuitry 604 may determine whether the user is disregarding the media asset using any of the methods discussed above during a first viewing of the media asset. If control circuitry 604 determines that the user is disregarding a segment of the media asset (e.g., when control circuitry 604 determines, based on a noise level in main room 202, that the user is talking to another user instead of viewing the media asset), control circuitry 604 proceeds to 906 where control circuitry 604 stores an indication that the user disregarded a segment. When control circuitry 604 determines that the user is paying attention to the media asset, control circuitry 604 proceeds to 922, where control circuitry 604 generates for display a next segment of the media asset, where the next segment is subsequent to the displayed segment in a playback sequence of the media asset. For example, at 922 control circuitry 604 may request a second scene of "The Godfather" after the user generates for display the first scene of "The Godfather". In response to transmitting the request, control circuitry 604 may receive the second scene of "The Godfather" from a content provider, such as media content source 716. In response to receiving the second scene, control circuitry 604 may generate for display the second scene and may proceed to 904 where control circuitry 604 monitors the user to determine whether the user is disregarding the second scene.

At 906, control circuitry 604 stores, in a profile associated with the user, a position within the media asset corresponding to the displayed segment of the media asset disregarded by the user and an indication that the user disregarded the segment of the media asset during the first time period. For example, control circuitry 604 may retrieve a profile of the user stored locally (e.g., on storage 608) or stored remote to control circuitry 604, such as on media guidance data source 718, via communications network 714. When control circuitry 604 receives the user profile, control circuitry 604 may update a viewing history in the user profile to contain the media asset (e.g., "The Godfather") and may include in the viewing history an indication of the segment that was missed by the user (e.g., because control circuitry 604 detected that user was disregarding the segment).

At 908, control circuitry 604 generates for display to the user, during the second time period subsequent to the first time period, the media asset beginning at a time in the media asset that precedes the segment. For example, control circuitry 604 may receive a second user selection of the media asset (e.g., "The Godfather") at a second time (e.g., a year after viewing "The Godfather" during the first time period). In response to receiving the second user selection, control circuitry 604 may generate for display the media asset beginning at a time in the media asset preceding the segment. For example, control circuitry 604 may generate for display the media asset starting at a first frame corresponding to the media asset. (e.g., so that the user can have another opportunity to view the segment of the media asset in context with the rest of the media asset). For example, control circuitry 604 may determine that, because greater than a threshold amount of time has passed, the user is likely to not remember content of the media asset, and therefore control circuitry 604 should begin the media asset at the beginning of the media asset. In another example, control circuitry 604 may determine that less than the threshold amount of time has passed (e.g., less than a week), and therefore control circuitry 604 may generate for display the media asset at a time substantially close to the beginning of the segment because the user likely remembers the content immediately preceding the segment (e.g., because the user did not disregard the media asset immediately preceding the segment).

At 910, control circuitry 604 determines, based on the profile, that the user previously accessed the media asset. For example, as discussed above, control circuitry 604 may authenticate a user and may then retrieve a viewing history from a profile associated with the authenticated user (e.g., from storage 608 or media guidance data source 718 via communications network 714). Control circuitry 604 may compare an identification of the media asset with a list of media assets in the viewing history. Control circuitry 604 may determine that the user previously accessed the media asset when the media asset appears in the viewing history.

At 912, control circuitry 604 retrieves, from the profile, the indication that the user disregarded the displayed segment of the media asset and the position within the media asset corresponding to the segment of the media asset. For example, as discussed above, control circuitry 604 may retrieve from the user profile an array indicating segments of the media asset disregarded by the user.

At 914, control circuitry 604 determines whether the play position of the media asset corresponds to the position of the segment. For example, control circuitry 604 may compare a current play position of the media asset, such as a position corresponding to playback indicator 114, to the position corresponding to segment 108 and/or segment 112 to determine whether the playback position is within either segment (e.g., the playback position is within a range of time in the media asset spanned by the segment). If control circuitry 604 determines that the play position of the media asset corresponds to the position, control circuitry 604 proceeds to 918 where control circuitry 604 determines whether the user is disregarding the media asset during the second time period. Otherwise, control circuitry 604 proceeds to 916 where control circuitry 604 waits until a play position of the media asset corresponds to the position. For example, control circuitry 604 may determine that the play position is at five minutes but the segment begins at ten minutes; accordingly, control circuitry 604 may wait for five minutes until proceeding to 918 (e.g., because after waiting for five minutes, the playback position will correspond to the segment).

At 918, control circuitry 604 determines whether the user is disregarding the media asset during the second time period. For example, control circuitry 604 may use any of the methods described above to determine whether the user is disregarding the media asset during the second time period, such as by tracking a user's eye movement and determining that the user is disregarding the media asset when the user's eyes do not correspond to a display where the media asset is generated for display by control circuitry 604. If control circuitry 604 determines that the user is disregarding the media asset during the second time period, control circuitry 604 continues to 920 where control circuitry 604 outputs an alert to the user so that the user can pay attention to the segment. Otherwise, control circuitry 604 proceed to 924 where control circuitry 604 updates the indication to indicate that the user has no longer disregarded the segment.

At 920, control circuitry 604 outputs an alert to the user based on the indication that the segment was previously missed by the user. For example, control circuitry 604 may output an alert such as alert 116 on a display screen accessible to control circuitry 604, such as display 102, 206, or 612, and/or a display of a second device associated with the user (e.g., the display of a smartphone of the user by communicating the alert over communications network 714). Control circuitry 604 may output the alert to get the attention of the user so that the user can maintain attention to the segment so that the segment is not missed by the user for a second time.

At 924, control circuitry 604 updates the indication to indicate that the user has no longer disregarded the segment. For example, control circuitry 604 may retrieve the user profile and may update the viewing history associated with the user to indicate a new date that the user last viewed the media asset (e.g., a current date) and may update the array indicating the segments missed by the user (e.g., by removing data corresponding to a segment that was viewed by the user). For example, control circuitry 604 removes the segment from the user profile so that the user will not be alerted again at a future time because the user has consumed the segment of the media asset.

It is contemplated that the steps or descriptions of FIG. 9 may be used with any other embodiment of this disclosure. In addition, the descriptions described in relation to the algorithm of FIG. 9 may be done in alternative orders or in parallel to further the purposes of this disclosure. For example, conditional statements and logical evaluations may be performed in any order or in parallel or substantially simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 9 may be implemented on a combination of appropriately configured software and hardware, and that any of the devices or equipment discussed in relation to FIGS. 1, 6-7 could be used to implement one or more portions of the process.

Figure 10:
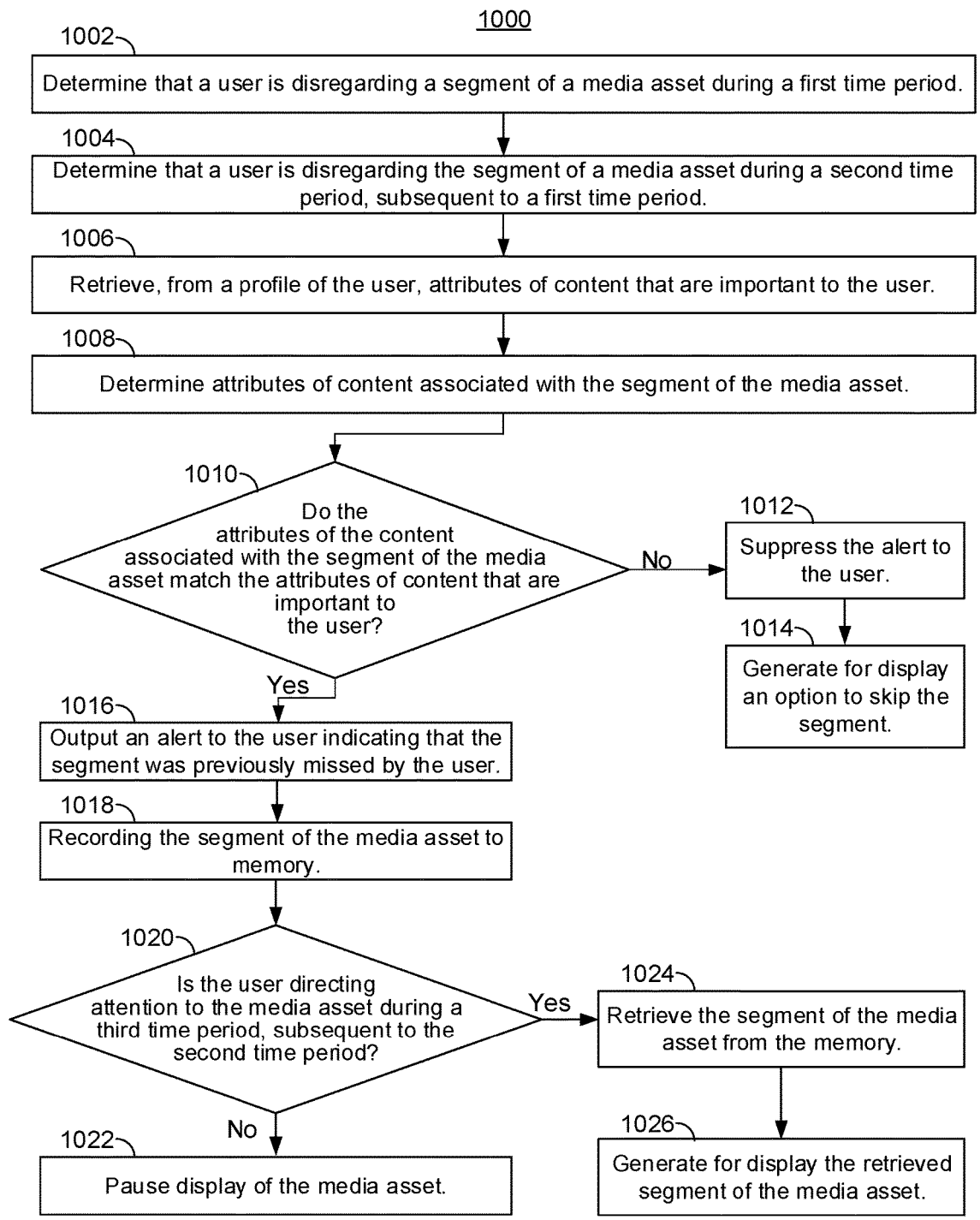
FIG. 10 depicts an illustrative process for determining whether to display an alert to the user, in accordance with some embodiments of the disclosure.

FIG. 10 is a flowchart of illustrative steps for determining whether to display an alert to a user, in accordance with some embodiments of the disclosure. For example, a media guidance application implementing process 1000 may be executed by control circuitry 604. In some embodiments, instructions for executing process 1000 may be encoded onto a non-transitory storage medium (e.g., storage 608) as a set of instructions to be decoded and executed by processing circuitry (e.g., processing circuitry 606). Processing circuitry may, in turn, provide instructions to other sub-circuits contained within control circuitry 604, such as the tuning, video generating, encoding, decoding, encrypting, decrypting, scaling, analog/digital conversion circuitry, and the like. It should be noted that process 1000, or any step thereof, could be performed on, or provided by, any of the devices shown in FIGS. 1, 6, and 7.

Process 1000 begins at 1002, where the media guidance application running on control circuitry 604 determines that a user is disregarding a segment of a media asset during a first time period. For example, control circuitry 604 may determine that the user 214 is disregarding a first media asset generated for display on display 206 by approximating a location of user 214 and determining that the approximate location of user 214 is greater than a threshold maximum distance away from display 206.

At 1004, control circuitry 604 determines that a user is disregarding the segment of a media asset during a second time period, subsequent to the first time period. For example, control circuitry 604 may determine that user 210 is disregarding a media asset generated for display by control circuitry 604 on display 206 at a second time (e.g., a time after the user has already requested viewing the media asset a first time) because control circuitry 604 may determine that user 210 is maintaining attention to user device 212 instead of display 206 as described above.

At 1006, control circuitry 604 retrieves, from a profile of the user, attributes of content that are important to the user. For example, control circuitry 604 may retrieve from a profile of the user (e.g., a profile stored on storage 608, or a profile stored remote to control circuitry 604 on media guidance data source 718 via communications network 714. For example, control circuitry 604 may infer attributes of content that are important to the user based on a viewing history of the user. For example, control circuitry 604 may profile the viewing history to determine, based on the history, content that is important to the user. For example, control circuitry 604 may profile viewing history comprising mostly football games and may determine that the user is a football fan.

At 1008, control circuitry 604 determines attributes of content associated with the segment of the media asset. For example, control circuitry 604 may perform an image analysis on a frame of the media asset to recognize objects in the frame of the media asset. Control circuitry 604 may determine, based on the detected objects, the content in the frame. For example, control circuitry 604 may detect football players and a football field in a frame of the media asset and may resultantly determine that the frame comprises sports content.

At 1010, control circuitry 604 determines whether attributes of the content associated with the segment of the media asset match the attributes of the content that are important to the user. For example, control circuitry 604 may compare the attributes that are important to the user (e.g., sport content) to the attributes detected in the media asset (e.g., football players and a football field) and may determine that the attributes that are important to the user match the attributes of the media asset by performing a fuzzy matching (e.g., sports content matches football content). When control circuitry 604 determines that the attributes of the content match attributes that are important to the user, control circuitry 604 proceeds to 1016. When control circuitry 604 determines that the attributes of the content do not match attributes that are important to the user, control circuitry 604 proceeds to 1012.

At 1012, control circuitry 604 suppresses the alert to the user. For example, control circuitry 604 may determine that the content in the segment of the media asset is not important to the user, therefore control circuitry 604 may determine that the user should not be bothered with an alert. Accordingly, control circuitry 604 may suppress the alert so that the user is not bothered to watch content that they may have purposely missed.

At 1014, control circuitry 604 generates for display an option to skip the segment. For example, control circuitry 604 may determine that the segment missed by the user is an intro trailer sequence for a television show. Control circuitry 604 may determine that the intro trailer is not important to the user and may therefore present the user with an option to skip the segment, even though the user had disregarded the portion when viewing the media asset during the first time period.

At 1016, control circuitry 604 outputs an alert to the user indicating that the segment was previously missed by the user. For example, control circuitry 604 may generate for display an alert such as alert 116 or may output an audible alert so that control circuitry 604 may gain the user's attention to a display where control circuitry 604 is generating for display the segment of the media asset.

At 1018, the segment of the media asset is recorded to memory. For example, control circuitry 604 may record the segment of the media asset so that control circuitry 604 can generate for display the segment upon detecting that the user is paying attention to the media asset. For example, control circuitry 604 may store the segment of the media asset and any content following the segment to a memory, such a storage 608 or media content source 716.

At 1020, control circuitry 604 determines whether the user is directing attention to the media asset during a third time period, subsequent to the second time period. For example, control circuitry 604 may monitor the user, while simultaneously recording the segment to memory, so that control circuitry 604 may generate for display the segment when the user resumes focus on the media asset. For example, control circuitry 604 may determine whether the user is paying attention to the media asset based on analyzing the gaze point of a user as discussed above. If control circuitry 604 determines that the user directs attention to the media asset during a third time period, control circuitry 604 proceeds to 1024 where control circuitry 604 plays back the segment for the user. If control circuitry 604 determines that the user does not direct attention to the media asset during a third time period, control circuitry 604 proceeds to 1022, where control circuitry 604 pauses a display of the media asset.

At 1024, control circuitry 604 retrieves the segment of the media asset from memory. For example, control circuitry 604 may retrieve the cached or recorded portion of the media asset from the memory to generate for display the media asset on a display, such as display 102, 206, or 612 at 1026.

At 1026, control circuitry 604 generates for display the retrieved segment of the media asset. For example, control circuitry 604 may generate for display the segment of the media asset so that the user can catch up to the segment without having to re-watch the media asset for a third time.

It is contemplated that the steps or descriptions of FIG. 10 may be used with any other embodiment of this disclosure. In addition, the descriptions described in relation to the algorithm of FIG. 10 may be done in alternative orders or in parallel to further the purposes of this disclosure. For example, conditional statements and logical evaluations may be performed in any order or in parallel or substantially simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 1, 6, and 7 could be used to implement one or more portions of the process.

Figure 11:
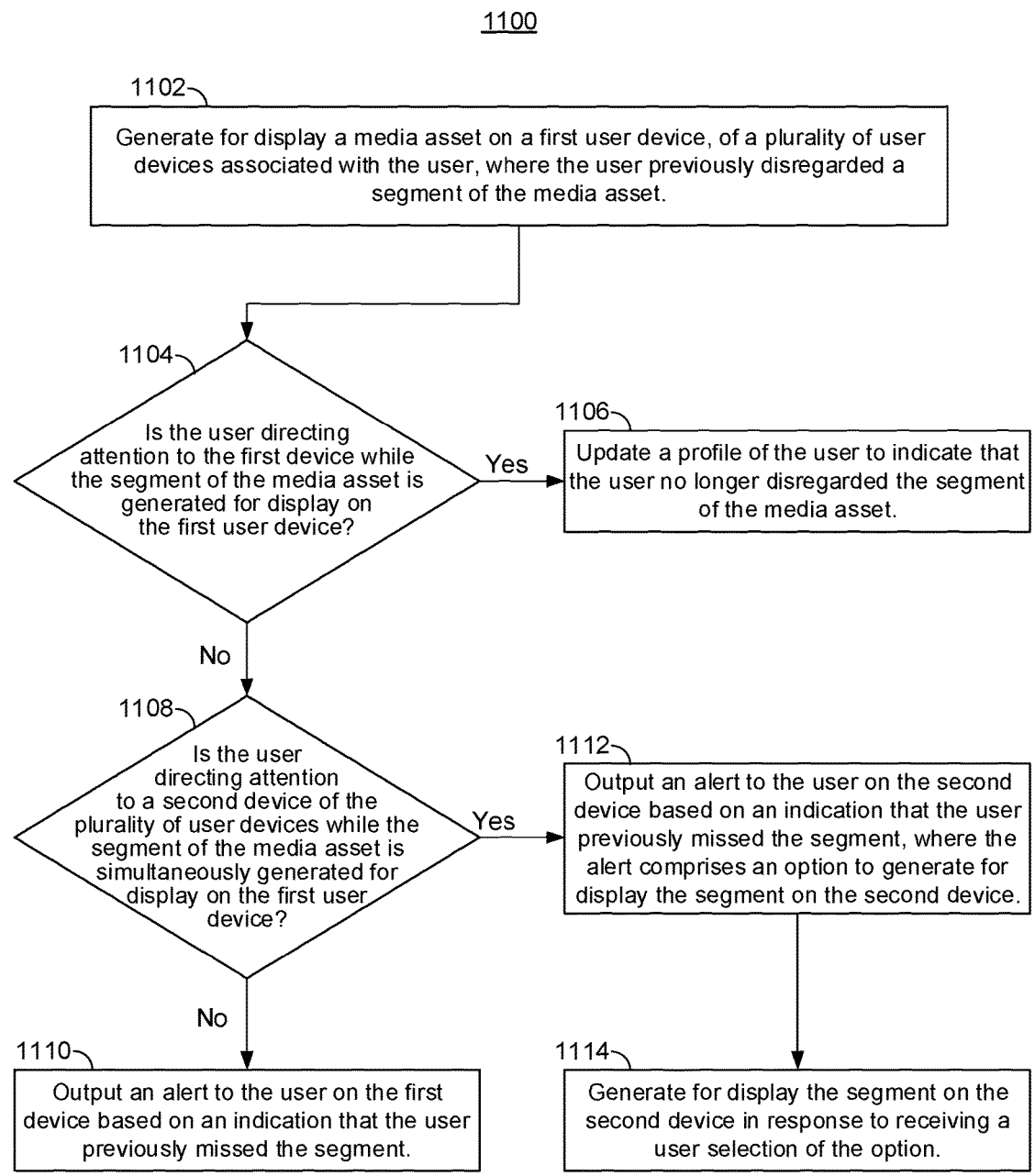
FIG. 11 depicts an illustrative process for selecting a device for outputting the alert, in accordance with some embodiments of the disclosure.

FIG. 11 is a flowchart of illustrative steps selecting a user device for outputting an alert to a user, in accordance with some embodiments of the disclosure. For example, a media guidance application implementing process 1100 may be executed by control circuitry 604. In some embodiments, instructions for executing process 1100 may be encoded onto a non-transitory storage medium (e.g., storage 608) as a set of instructions to be decoded and executed by processing circuitry (e.g., processing circuitry 606). Processing circuitry may, in turn, provide instructions to other subcircuits contained within control circuitry 604, such as the tuning, video generating, encoding, decoding, encrypting, decrypting, scaling, analog/digital conversion circuitry, and the like. It should be noted that process 1100, or any step thereof, could be performed on, or provided by, any of the devices shown in FIGS. 1, 6 and 7.

Process 1100 begins at 1102, where the media guidance application running on control circuitry 604 generates for display a media asset on a first user device of a plurality of user devices associated with the user, where the user previously disregarded a segment of the media asset. For example, control circuitry 604 may generate for display the media asset on a display 206 of a plurality of devices associated with the user, such as user device 216 and 212 and display 102.

At 1104, control circuitry 604 determines whether the user is directing attention to the first device while the segment of the media asset is generated for display by control circuitry 604 for display on the first user device. For example, control circuitry 604 may generate for display the media asset on the first device by requesting the media asset from a content provider, by sending a request to media content source 716 via communications network 714. In response to sending the request, control circuitry 604 may receive a stream of video data corresponding to the media asset. Control circuitry 604 may access a camera of the first device, such as camera 128, via user input interface 610 to capture images of the user to determine whether the user is maintaining attention to a display, such as display 612 of the first device. Control circuitry 604 may proceed to 106 when control circuitry 604 determines that the user is directing their attention to the media asset so that control circuitry 604 may update the profile of the user to indicate that the user has no longer disregarded the segment of the media asset. Control circuitry 604 may proceed to 1108 when control circuitry 604 determines that the user is not directing attention to the first device to determine where to output the alert.

At 1006, control circuitry 604 updates the profile of the user to indicate that the user has no longer disregarded the segment of the media asset. For example, control circuitry 604 may retrieve the profile of the user from the memory and may remove an indication that the user missed the segment or may update the user profile to comprise data indicating a date or time that the user watched the segment. Upon updating the profile, control circuitry 604 may upload changes to the profile to a locally stored database on storage 608 or a database stored remotely to control circuitry 604 in media guidance data source 718 via communications network 714.

At 1108, control circuitry 604 determines whether the user is directing attention to a second device of the plurality of user devices while the segment of the media asset is simultaneously generated for display on the first user device. For example, control circuitry 604 may determine whether the user is directing attention to a second device instead of the first device by, for example, tracking user activities on the second device to determine whether the user is using the device while the media asset is generated for display by control circuitry 604 on the first device. If control circuitry 604 determines that the user is directing attention to a second device, control circuitry 604 proceeds to 1112 to output the alert to the user on the second device. If control circuitry 604 determines that the user is not directing attention to the second device, control circuitry 604 outputs the alert to the user on the first device.

At 1110, control circuitry 604 outputs the alert to the user on the first device based on an indication that the user previously missed the segment. For example, control circuitry 604 may generate for display an alert such as alert 116 on the first device.

At 1112, control circuitry 604 outputs an alert to the user on the second device based on an indication that the user previously missed the segment, where the alert comprises an option to generate for display the segment on the second device. For example, control circuitry 604 may determine that the second device is a wearable media device, such as a smartwatch. Control circuitry 604 may direct the second device to output an audio notification alerting the user about the segment that they will miss and providing an option to generate for display the segment on the second device.

At 1114, control circuitry 604 generates for display the segment on the second device in response to receiving a user selection of the option. For example, control circuitry 604 may detect an audio input via user input interface 610 requesting display of the segment on the second device. In response to receiving the user input, control circuitry 604 may request a version of the media asset for display on the second device.

It is contemplated that the steps or descriptions of FIG. 11 may be used with any other embodiment of this disclosure. In addition, the descriptions described in relation to the algorithm of FIG. 11 may be done in alternative orders or in parallel to further the purposes of this disclosure. For example, conditional statements and logical evaluations may be performed in any order or in parallel or substantially simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 11 may be implemented on a combination of appropriately configured software and hardware, and that any of the devices or equipment discussed in relation to FIGS. 1 and 6-7 could be used to implement one or more portions of the process.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for automatically alerting a user that a segment in a media asset that was previously missed by the user will be missed again by notifying the user to maintain attention to the segment, the method comprising:

generating for display to a user, during a first time period, the media asset;

detecting that the user is disregarding the segment of the media asset during the first time period;

in response to detecting that the user is disregarding the segment of the media asset during the first time period, storing, in a profile associated with the user, a position within the media asset corresponding to the segment of the media asset disregarded by the user and an indication that the user disregarded the segment of the media asset during the first time period;

generating for display to the user, during a second time period subsequent to the first time period, the media asset beginning at a time in the media asset that precedes the segment;

determining, based on the profile of the user, whether the user has previously accessed the media asset; and in response to determining that the user has previously accessed the media asset:

retrieving, from the profile, the indication that the user disregarded the segment of the media asset and the position within the media asset corresponding to the segment of the media asset;

determining, during the second time period, whether a play position of the media asset corresponds to the position; and in response to determining that the play position of the media asset corresponds to the position:

determining whether the user is disregarding the media asset during the second time period; and in response to determining that the user is disregarding the media asset during the second time period, outputting an alert to the user, based on the indication, that the segment was previously missed by the user.

2. The method of claim 1, wherein outputting the alert to the user further comprises:

retrieving, from the profile of the user, attributes of content that are important to the user;

determining an attribute of content associated with the segment of the of the media asset;

determining whether the attribute of the content associated with the segment matches an attribute of the attributes of content that are important to the user;

in response to determining that the attribute of the content associated with the segment matches an attribute of the attributes of the content that are important to the user, outputting the alert to the user.

3. The method of claim 2, further comprising, suppressing the alert to the user in response to determining that the attributes of the content associated with the segment do not match the attributes of the content that are important to the user.

4. The method of claim 1, wherein the segment of the media asset is generated for display to the user on a first user device, and wherein detecting that a user is disregarding the segment of the media asset during the first time period, further comprises:

detecting that the user is directing attention to a second user device while the segment of the media asset is simultaneously generated for display on the first user device;

in response to detecting that the user is directing attention to the second user device while the segment of the media asset is simultaneously generated for display on the first user device, outputting the alert to the user on the second user device.

5. The method of claim 4, wherein the alert comprises a selectable option for outputting the segment of the media asset on the second user device, further comprising:

receiving a user selection of the selectable option; and generating for display the segment of the media asset on the second user device.

6. The method of claim 1, further comprising pausing display of the media asset at the position in response to determining that the user is disregarding the media asset during the second time period.

7. The method of claim 1, wherein the alert comprises a selectable option to skip the segment of the media asset, further comprising:

skipping playback of the segment of the media asset in response to receiving a user selection of the selectable option.

8. The method of claim 7, further comprising, generating for display the selectable option to skip the segment of the media asset in response to determining that attributes of the segment of the media asset do not match attributes of content that are important to the user.

9. The method of claim 1, further comprising:

determining that the user is disregarding the alert;

in response to determining that the user is disregarding the alert, concurrently recording the segment of the media asset to a memory and generating for display the segment;

determining that the user is directing attention to the alert subsequent to the generating for display the segment; and in response to determining that the user is directing attention to the alert subsequent to the generating for display the segment:

retrieving the segment of the media asset from the memory; and generating for display the retrieved segment of the media asset.

10. The method of claim 1, wherein the media asset is generated for display to the user on first user equipment during the first time period, and wherein determining whether the user is disregarding the media asset further comprises:

detecting, using a camera associated with the first user equipment, a gaze point corresponding to the user during the first time period; and determining that the user is disregarding the media asset in response to determining that the gaze point does not correspond to the camera associated with the first user equipment.

11. A system for automatically alerting a user that a segment in a media asset that was previously missed by the user will be missed again by notifying the user to maintain attention to the segment, the system comprising control circuitry configured to:

generate for display to a user, during a first time period, the media asset;

detect that the user is disregarding the segment of the media asset during the first time period;

in response to detecting that the user is disregarding the segment of the media asset during the first time period, store, in a profile associated with the user, a position within the media asset corresponding to the segment of the media asset disregarded by the user and an indication that the user disregarded the segment of the media asset during the first time period;

generate for display to the user, during a second time period subsequent to the first time period, the media asset beginning at a time in the media asset that precedes the segment;

determine, based on the profile of the user, whether the user has previously accessed the media asset; and in response to determining that the user has previously accessed the media asset:

retrieve, from the profile, the indication that the user disregarded the segment of the media asset and the position within the media asset corresponding to the segment of the media asset;

determine, during the second time period, whether a play position of the media asset corresponds to the position; and in response to determining that the play position of the media asset corresponds to the position:

determine whether the user is disregarding the media asset during the second time period; and in response to determining that the user is disregarding the media asset during the second time period, output an alert to the user, based on the indication, that the segment was previously missed by the user.

12. The system of claim 11, wherein the control circuitry is further configured, when outputting the alert to the user, to:

retrieve, from the profile of the user, attributes of content that are important to the user;

determine an attribute of content associated with the segment of the of the media asset;

determine whether the attribute of the content associated with the segment matches an attribute of the attributes of content that are important to the user;

in response to determining that the attribute of the content associated with the segment matches an attribute of the attributes of the content that are important to the user, output the alert to the user.

13. The system of claim 12, wherein the control circuitry is further configured to, suppress the alert to the user in response to determining that the attributes of the content associated with the segment do not match the attributes of the content that are important to the user.

14. The system of claim 11, wherein the segment of the media asset is generated for display to the user on a first user device, and wherein the control circuitry is further configured, when detecting that a user is disregarding the segment of the media asset during the first time period, to:

detect that the user is directing attention to a second user device while the segment of the media asset is simultaneously generated for display on the first user device;

in response to detecting that the user is directing attention to the second user device while the segment of the media asset is simultaneously generated for display on the first user device, output the alert to the user on the second user device.

15. The system of claim 14, wherein the alert comprises a selectable option for outputting the segment of the media asset on the second user device, and wherein the control circuitry is further configured to:

receive a user selection of the selectable option; and generate for display the segment of the media asset on the second user device.

16. The system of claim 11, wherein the control circuitry is further configured to pause display of the media asset at the position in response to determining that the user is disregarding the media asset during the second time period.

17. The system of claim 11, wherein the alert comprises a selectable option to skip the segment of the media asset, and wherein the control circuitry is further configured to:

skip playback of the segment of the media asset in response to receiving a user selection of the selectable option.

18. The system of claim 17, wherein the control circuitry is further configured to generate for display the selectable option to skip the segment of the media asset in response to determining that attributes of the segment of the media asset do not match attributes of content that are important to the user.

19. The system of claim 11, wherein the control circuitry is further configured to:

determine that the user is disregarding the alert;

in response to determining that the user is disregarding the alert, concurrently record the segment of the media asset to a memory and generating for display the segment;

determine that the user is directing attention to the alert subsequent to the generating for display the segment; and in response to determining that the user is directing attention to the alert subsequent to the generating for display the segment:

retrieve the segment of the media asset from the memory; and generate for display the retrieved segment of the media asset.

20. The system of claim 11, wherein the media asset is generated for display to the user on first user equipment during the first time period, and wherein the control circuitry is further configured, when determining whether the user is disregarding the media asset, to:

detect, using a camera associated with the first user equipment, a gaze point corresponding to the user during the first time period; and determine that the user is disregarding the media asset in response to determining that the gaze point does not correspond to the camera associated with the first user equipment.

* * * * *